(12) United States Patent
Cui et al.

(10) Patent No.: US 12,369,152 B2
(45) Date of Patent: Jul. 22, 2025

(54) TRANSMISSION OF SOUNDING REFERENCE SIGNAL (SRS) BASED ON SRS TRANSMIT ANTENNA PORT SWITCHING

(71) Applicant: Apple Inc., Cupertino, CA (US)

(72) Inventors: Jie Cui, San Jose, CA (US); Qiming Li, Beijing (CN); Dawei Zhang, Saratoga, CA (US); Haitong Sun, Cupertino, CA (US); Hong He, San Jose, CA (US); Huaning Niu, San Jose, CA (US); Manasa Raghavan, Sunnyvale, CA (US); Xiang Chen, Campbell, CA (US); Yang Tang, San Jose, CA (US); Yushu Zhang, Beijing (CN)

( * ) Notice: Subject to any disclaimer, the term of this patent is extended or adjusted under 35 U.S.C. 154(b) by 298 days.

(21) Appl. No.: 17/442,579

(22) PCT Filed: Apr. 1, 2021

(86) PCT No.: PCT/CN2021/085011
§ 371 (c)(1),
(2) Date: Sep. 23, 2021

(87) PCT Pub. No.: WO2022/205334
PCT Pub. Date: Oct. 6, 2022

(65) Prior Publication Data
US 2023/0337229 A1    Oct. 19, 2023

(51) Int. Cl.
*H04W 72/1273*    (2023.01)
*H04L 5/00*    (2006.01)

(52) U.S. Cl.
CPC ....... *H04W 72/1273* (2013.01); *H04L 5/0048* (2013.01)

(58) Field of Classification Search
CPC .......... H04W 72/1273; H04L 5/0048
See application file for complete search history.

(56) References Cited

U.S. PATENT DOCUMENTS

2019/0306924 A1    10/2019  Zhang et al.
2020/0267571 A1    8/2020   Park et al.
(Continued)

FOREIGN PATENT DOCUMENTS

| CN | 106685613 | 5/2017 |
| CN | 108811075 | 11/2018 |

(Continued)

OTHER PUBLICATIONS

3rd Generation Partnership Project; Technical Specification Group Radio Access Network; NR; Requirements for support of radio resource management (Release 16), 3GPP TS 38.133 V16.6.0, Dec. 2020, 1844 pages.

(Continued)

*Primary Examiner* — Duc C Ho
(74) *Attorney, Agent, or Firm* — Kilpatrick Townsend & Stockton LLP

(57) ABSTRACT

The present application relates to devices and components including apparatus, systems, and methods to perform SRS transmission when a UE supports SRS Tx antenna port switching. In an example, a determination is made about whether a scheduled SRS transmission impacts a scheduled DL reception given the SRS Tx antenna port switching. If so, the SRS transmission and/or the DL reception are changed. In a further example, the UE can supports an SRS TA capability in conjunction with the SRS Tx antenna port switching capability. In this example, SRS TA can be applied to a scheduled SRS transmission.

20 Claims, 16 Drawing Sheets

(56) References Cited

U.S. PATENT DOCUMENTS

2020/0322187 A1 10/2020 He et al.
2021/0112498 A1* 4/2021 Duan .................. H04L 5/0094

FOREIGN PATENT DOCUMENTS

| CN | 108886457 |   | 11/2018 |
|----|-----------|---|---------|
| CN | 111713037 | A | 9/2020  |
| JP | 2019521600 | A | 7/2019 |
| JP | 2020502847 | A | 1/2020 |
| WO | 2013109084 |   | 7/2013 |
| WO | 2020164036 | A1 | 8/2020 |
| WO | 2020164589 | A1 | 8/2020 |

OTHER PUBLICATIONS

3rd Generation Partnership Project; Technical Specification Group Radio Access Network; NR; User Equipment (UE) radio access capabilities (Release 16), 3GPP TS 38.306 V16.3.0, Dec. 2020, 135 pages.

3rd Generation Partnership Project; Technical Specification Group Radio Access Network; NR; Physical layer procedures for data (Release 16), 3GPP TS 38.214 V16.4.0, Dec. 2020, 169 pages.

3rd Generation Partnership Project; Technical Specification Group Radio Access Network; NR; Physical layer procedures for data (Release 16), 3GPP TS 38.214 V16.5.0, Mar. 2021, 171 pages.

3rd Generation Partnership Project; Technical Specification Group Radio Access Network; NR; Requirements for support of radio resource management (Release 17), 3GPP TS 38.133 V17.0.0, Dec. 2020, 1812 pages.

Email Discussion Summary for [98e][231] NR_RRM_Enh2_1, R4-2103470, 3GPP TSG-RAN4 Meeting #98-e, Moderator (Apple), Feb. 5, 2021, 56 pages.

On RRM Requirements for SRS Antenna Port Switching, R4-2102534, 3GPP TSG-RAN WG4 Meeting #98-e, Ericsson, Feb. 5, 2021, 3 pages.

On SRS Antenna Port Switching, R4-2100192, 3GPP TSG-RAN4 Meeting #98-e, Apple, Feb. 5, 2021, 4 pages.

International Patent Application No. PCT/CN2021/085011, International Search Report and Written Opinion, Mailed on Jan. 7, 2022, 10 pages.

Office Action issued in Japan Application No. JP2023-559824, dated Sep. 20, 2024 in 9 pages.

Chinese Parent Application No. 202180005815.7, Office Action, Mailed On Feb. 17, 2025, 8 pages.

"Interruption At SRS Antenna Switching", 3rd Generation Partnership Project Technical Specification Group-Radio Access Network Working Group4 Meeting #90, R4-1900682, February 25-Mar. 1, 2019, 6 pages.

European Patent Application No. 21933992.6, Extended European Search Report, Mailed On Nov. 26, 2024, 10 pages.

* cited by examiner

TRANSMISSION OF SOUNDING REFERENCE SIGNAL (SRS) BASED ON SRS TRANSMIT ANTENNA PORT SWITCHING

CROSS-REFERENCE TO RELATED APPLICATIONS

This application is a U.S. National Phase of PCT/CN2021/085011 filed Apr. 1, 2021, the disclosure of which is herein incorporated by reference in its entirety for all purposes.

Fifth generation mobile network (5G) is a wireless standard that aims to improve upon data transmission speed, reliability, availability, and more. This standard, while still developing, includes numerous details relating to the user of a sounding reference signal (SRS). RS is a reference signal transmitted by a UE to a base station on an uplink channel, such that the base station can determine information about the uplink channel, such as the combined effect of multipath fading, scattering, and Doppler effect, among other types of information.

DETAILED DESCRIPTION

Figure 1:
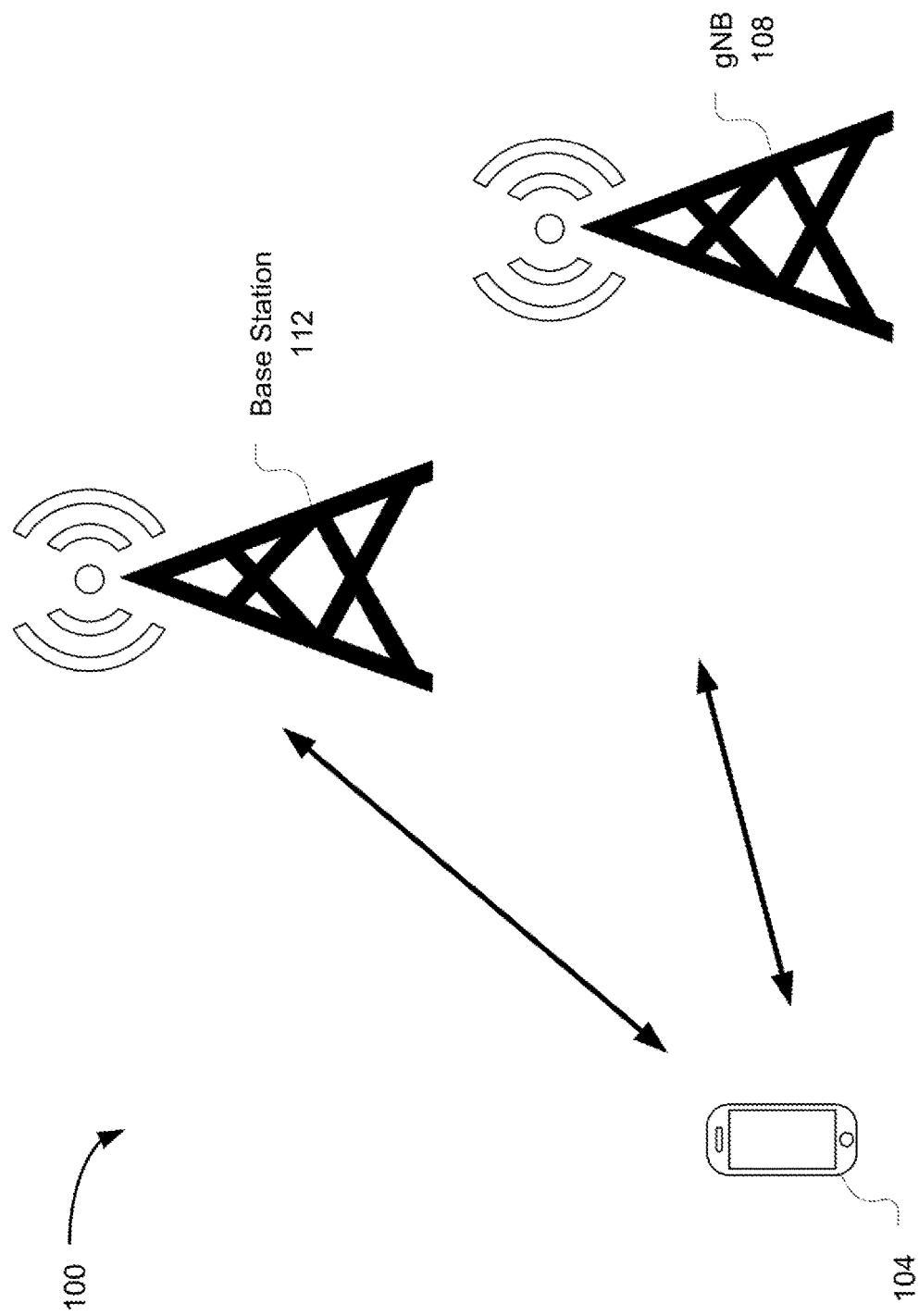
FIG. 1 illustrates an example of a network environment, in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Generally, a user equipment (UE) can support the capability of sounding reference signal (SRS) transmit (Tx) antenna port switch, where the UE can switch between different antenna ports for the transmission of SRSs. This capability can impact the transmit and/or receiving functionalities of the UE. For example, if an uplink (UL) chain and a downlink (DL) chain of the UE share radio frequency (RF) components, DL reception can be impacted because of the needed RF adjustment between transmitting and receiving. In addition, a guard period can be used around the SRS symbol. This guard period has a length of at least of one symbol and no UL transmission is possible in it. Here, if the SRS symbol is the last symbol in a slot, an associated guard period would fall in the adjacent slot, thereby preventing the use of at least the first symbol in the adjacent slot. Similarly, if the SRS is the eighth symbol in the of the slot (it can only be one of the last six symbols of the slot), an associated guard period would fall in the seventh symbol of the slot, thereby preventing the use of at least the seventh symbol of the slot.

Embodiments of the present disclosure improve the transmit and/or receive functionalities when the SRS Tx antenna port switch is supported. Such embodiments can be implemented on the UE, a base station in communication with the UE, or distributed between the UE and the base station. In a first example, when the DL reception is impact, the SRS transmission can be aborted or rescheduled. This can be the case when the DL or carries high priority traffic or control information. Alternatively, the DL reception can be aborted or rescheduled. In a second example, an SRS timing advance (TA). The UE can forward or delay the SRS transmission to avoid the guard period from falling in the adjacent slot or in the seventh symbol of the slot The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer to an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "base station" as used herein refers to a device with radio communication capabilities, that is a network element of a communications network (or, more briefly, network), and that may be configured as an access node in the communications network. A UE's access to the communications network may be managed at least in part by the base station, whereby the UE connects with the base station to access the communications network. Depending on the radio access technology (RAT), the base station can be referred to as a gNodeB (gNB), eNodeB (eNB), access point, etc.

The term "computer system" as used herein refers to any type of interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refer to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100, in accordance with some embodiments. The network environment 100 may include a UE 104 and a gNB 108. The gNB 108 may be a base station that provides a wireless access cell, for example, a Third Generation Partnership Project (3GPP) New Radio (NR) cell, through which the UE 104 may communicate with the gNB 108. The UE 104 and the gNB 108 may communicate over an air interface compatible with 3GPP technical specifications such as those that define Fifth Generation (5G) NR system standards.

The gNB 108 may transmit information (for example, data and control signaling) in the downlink direction by mapping logical channels on the transport channels, and transport channels onto physical channels. The logical channels may transfer data between a radio link control (RLC) and media access control (MAC) layers; the transport channels may transfer data between the MAC and PHY layers; and the physical channels may transfer information across the air interface. The physical channels may include a physical broadcast channel (PBCH), a physical downlink control channel (PDCCH), and a physical downlink shared channel (PDSCH).

The PBCH may be used to broadcast system information that the UE 104 may use for initial access to a serving cell. The PBCH may be transmitted along with physical synchronization signals (PSS) and secondary synchronization signals (SSS) in a synchronization signal (SS)/PBCH block. The SS/PBCH blocks (SSBs) may be used by the UE 104 during a cell search procedure (including cell selection and reselection) and for beam selection.

The PDSCH may be used to transfer end-user application data, signaling radio bearer (SRB) messages, system information messages (other than, for example, MIB), and paging messages.

The PDCCH may transfer downlink control information (DC) that is used by a scheduler of the gNB 108 to allocate both uplink and downlink resources. The DCI may also be used to provide uplink power control commands, configure a slot format, or indicate that preemption has occurred.

The gNB 108 may also transmit various reference signals to the UE 104. The reference signals may include demodulation reference signals (DMRSs) for the PBCH, PDCCH, and PDSCH. The UE 104 may compare a received version of the DMRS with a known DMRS sequence that was transmitted to estimate an impact of the propagation channel. The UE 104 may then apply an inverse of the propagation channel during a demodulation process of a corresponding physical channel transmission.

The reference signals may also include channel status information reference signals (CSI-RS). The CSI-RS may be a multi-purpose downlink transmission that may be used for CSI reporting, beam management, connected mode mobility, radio link failure detection, beam failure detection and recovery, and fine tuning of time and frequency synchronization.

The reference signals and information from the physical channels may be mapped to resources of a resource grid. There is one resource grid for a given antenna port, subcarrier spacing configuration, and transmission direction (for example, downlink or uplink). The basic unit of an NR downlink resource grid may be a resource element, which may be defined by one subcarrier in the frequency domain and one orthogonal frequency division multiplexing (OFDM) symbol in the time domain. Twelve consecutive subcarriers in the frequency domain may compose a physical resource block (PRB). A resource element group (REG) may include one PRB in the frequency domain and one OFDM symbol in the time domain, for example, twelve resource elements. A control channel element (CCE) may represent a group of resources used to transmit PDCCH. One CCE may be mapped to a number of REGs, for example, six REGs.

Transmissions that use different antenna ports may experience different radio channels. However, in some situations, different antenna ports may share common radio channel characteristics. For example, different antenna ports may have similar Doppler shifts, Doppler spreads, average delay, delay spread, or spatial receive parameters (for example, properties associated with a downlink received signal angle of arrival at a UE). Antenna ports that share one or more of these large-scale radio channel characteristics may be said to be quasi co-located (QCL) with one another. 3GPP has specified four types of QCL to indicate which particular channel characteristics are shared. In QCL Type A, antenna ports share Doppler shift, Doppler spread, average delay, and delay spread. In QCL Type B, antenna ports share Doppler shift and Doppler spread. In QCL Type C, antenna ports share Doppler shift and average delay. In QCL Type D, antenna ports share spatial receiver parameters.

The gNB 108 may provide transmission configuration indicator (TCI) state information to the UE 104 to indicate QCL relationships between antenna ports used for reference signals (for example, synchronization signal/PBCH or CSI-RS) and downlink data or control signaling, for example, PDSCH or PDCCH. The gNB 108 may use a combination of RRC signaling, MAC control element signaling, and DC to inform the UE 104 of these QCL relationships.

The UE 104 may transmit data and control information to the gNB 108 using physical uplink channels. Different types of physical uplink channels are possible including, for instance, a physical uplink control channel (PUCCH) and a physical uplink shared channel (PUSCH). Whereas the PUCCH carries control information from the UE 104 to the gNB 108, such as uplink control information (UCI), the PUSCH carries data traffic (e.g., end-user application data) and can carry UCI. Reference signals can also be transmitted from the UE 104 to the gNB 108 for deriving information about the UL from the UE 104 to the gNB 108. Such reference signals include, for instance, SRS.

The UE 104 and the gNB 108 may perform beam management operations to identify and maintain desired beams for transmission in the uplink and downlink directions. The beam management may be applied to both PDSCH and PDCCH in the downlink direction, and PUSCH and PUCCH in the uplink direction.

In an example, communications with the gNB 108 and/or the base station can use channels in the frequency range 1 (FR1) band (between 40 Megahertz (MHz) and 7,125 MHz) and/or frequency range 2 (FR2) band (between 24,250 MHz and 52,600 MHz). The FR1 band includes a licensed band and an unlicensed band. The NR unlicensed band (NR-U) includes a frequency spectrum that is shared with other types of radio access technologies (RATs) (e.g., LTE-LAA, WiFi, etc.). A listen-before-talk (LBT) procedure can be used to avoid or minimize collision between the different RATs in the NR-U, whereby a device should applies a clear channel assessment (CCA) check before using the channel.

As further illustrated in FIG. 1, the network environment 100 may further include a base station 112 with which the UE 104 may also connect. The base station 112 supports the same RAT as the gNB 108 (e.g., the base station 112 is also a gNB). Additionally or alternatively, the base station 112 supports a different RAT (e.g., Long-Term Evolution (LTE) eNB).

In an example, the UE 104 supports carrier aggregation (CA), whereby the UE 104 can connect and exchange data simultaneously over multiple component carriers (CCs) with the gNB 108 and/or the base station 112. The CCs can belong to a same frequency band, in which case they are referred to as intra-band CCs. Intra-band CCs can be contiguous or non-contiguous. The CCs can also belong to different frequency bands, in which case they are referred to as inter-band CCs. A serving cell can be configured for the UE 104 to use a CC. A serving cell can be a primary (PCell), a primary secondary cell (PSCell), or a secondary cell (SCell). Multiple SCells can be activated via an SCell activation procedures where the component carriers of these serving cells can be intra-band contiguous, intra-band noon-contiguous, or inter-band. The serving cells can be collocated or non-collocated.

Further, the UE 104 can support SRS Tx antenna port switching. This type of capability can impact the SRS transmission on a same UL carrier (e.g., a UL CC) or the reception on a DL carrier (e.g., a DL CC). The UL CC and the DL CC can be one of a set of band combinations that the UE 104 supports.

Figure 2:
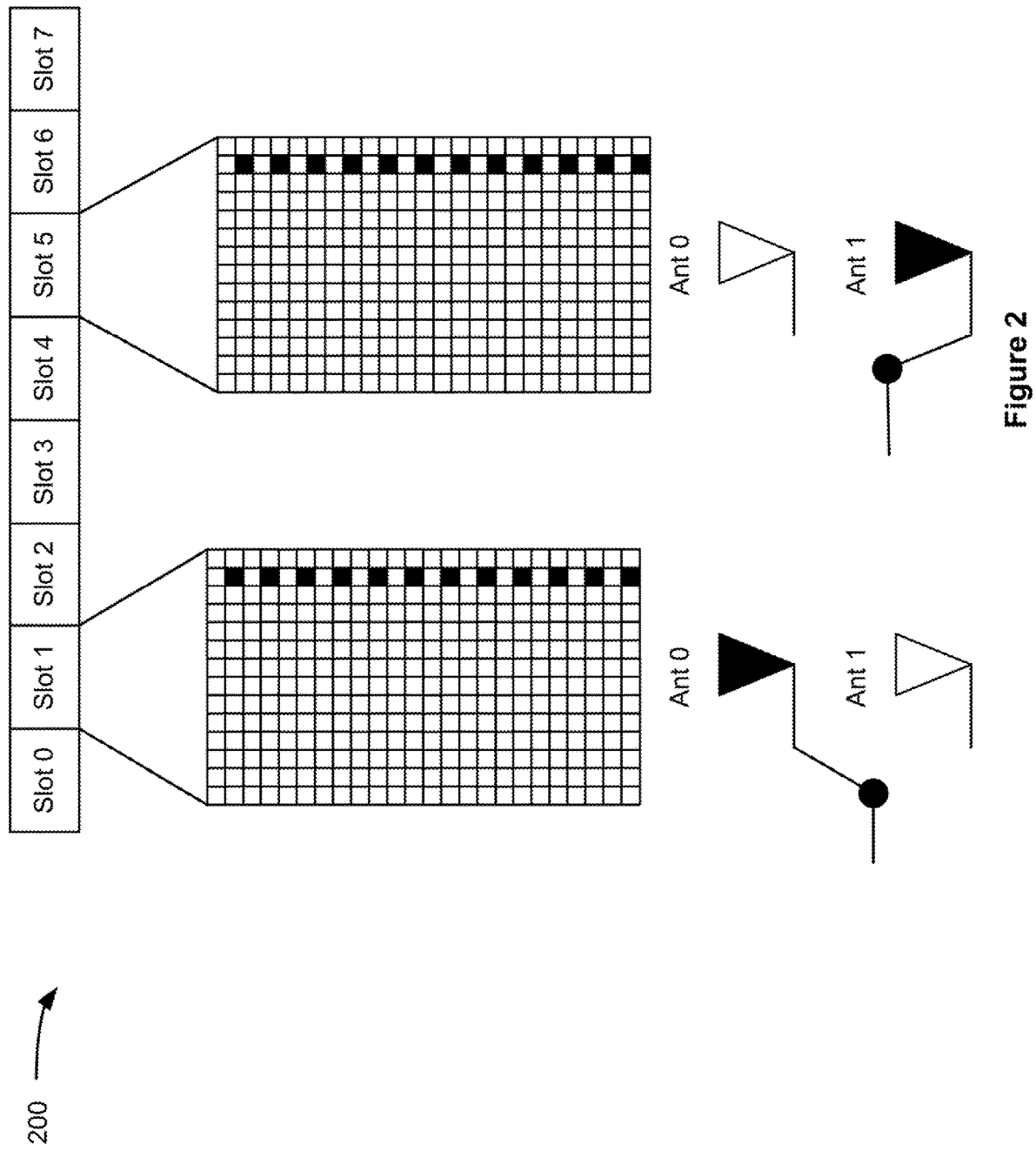
FIG. 2 illustrates an example of sounding reference signal (SRS) transmit antenna port switching, in accordance with some embodiments.

FIG. 2 illustrates an example of SRS transmit antenna port switching 200, in accordance with some embodiments. In the illustration, multiple slots within a frame can be used for transmission on an UL CC. FIG. 2 shows eight slots numbered from "0" to "7," although a different number of slots is possible. The transmission can include SRS transmissions, such as at "slot 1" and "slot 5." Here also, FIG. 2 shows SRS transmissions at these two particular slots, each using a particular SRS resource set. However, a different number of SRS transmissions, a different number or other slots can be used for the SRS transmissions, and/or a different SRS resource set per slot are possible. The resource grids of "slot 1" and "slot 5" are also shown, each indicating the SRS resource set with a dark solid rectangle. Although FIG. 2 shows the two slots as using a similar pattern for the SRS resource sets, a different pattern can be used. Generally, along the time domain, an SRS is encoded in an OFDMA symbol, and this symbol can only be one of the last six symbols of the slot.

In an example, the UE uses a 1T2R capability of the SRS Tx antenna port switching. Other SRS Tx antenna port switching capabilities are possible as further described herein below. The 1T2R capability corresponds to the UE using the same SRS port (e.g., SRS port "0") for transmitting a first SRS resource set and a second SRS resource set, while switching between two different antenna ports (e.g., "antenna port 0" and "antenna port 1") for the transmissions of these two SRS resource sets. In the illustration of FIG. 2 "antenna port 0" is used for the SRS transmission of "slot 1." For the SRS transmission of "slot 5," the antenna port is switched to "antenna port L."

3GPP TS 38.306 V 16.3.0 (2020-12) refers to the SRS Tx antenna port switching as "srs-TxSwitch, srs-TxSwitch-v1610." It defines this capability as whether UE supports SRS for DL CSI acquisition as defined in clause 6.2.1.2 of TS 38.214. The capability signalling comprises of the following parameters:

supportedSRS-TxPortSwitch indicates SRS Tx port switching pattern supported by the UE, which is mandatory with capability signaling. The indicated UE antenna switching capability of 'xTyR' corresponds to a UE, capable of SRS transmission on 'x' antenna ports over total of 'y' antennas, where 'y' corresponds to all or subset of UE receive antennas, where 2T4R is two pairs of antennas, supportedSRS-TxPortSwitch-v1610, which is optional to report, indicates downgrading configuration of SRS Tx port switching pattern. If the UE indicates the support of downgrading configuration of SRS Tx port switching pattern using supportedSRS-TxPortSwitch-v1610, the UE shall report the values for this as below, based on what is reported in supportedSRS-TxPortSwitch.

| supportedSRS-TxPortSwitch | supportedSRS-TxPortSwitch-v1610 |
|---|---|
| t1r2 | t1r1-t1r2 |
| t1r4 | t1r1-t1r2-t1r4 |
| t2r4 | t1r1-t1r2-t2r2-t2r4 |
| t2r2 | t1r1-t2r2 |
| t4r4 | t1r1-t2r2-t4r4 |
| t1r4-t2r4 | (t1r1-t1r2-t2r2-t1r4-t2r4 | txSwitchimpactToRx indicates the entry number of the first-listed band with UL (see NOTE) in the band combination that affects this DL, which is mandatory with capability signaling;

txSwitchWithAnotherBand indicates the entry number of the first-listed band with UL (see NOTE) in the band combination that switches together with this UL, which is mandatory with capability signaling.

For txSwitchImpactToRx and txSwitchWithAnotherBand, value 1 means first entry, value 2 means second entry and so on. All DL and UL that switch together indicate the same entry number.

The entry number is the band entry number in a band combination. The UE is restricted not to include fallback band combinations for the purpose of indicating different SRS antenna switching capabilities.

With SRS Tx antenna port switching, a certain period of time may be needed to adjust the RF chain for an SRS transmission on a UL CC. This adjustment can impact the reception on a DL CC when the UL and DL share RF components of the RF chain. This impact can be signaled from the UE to the network. In particular, 3GPP TS 38.306 V 16.3.0 (2020-12) describes using the above "txSwitchImpactToRx" as an indication of this impact. Nonetheless, beyond indicating that a DL CC is affected, there is no definition for a process to mitigate the impact. Embodiments of such a process are described in connection with the next figures.

Figure 3:
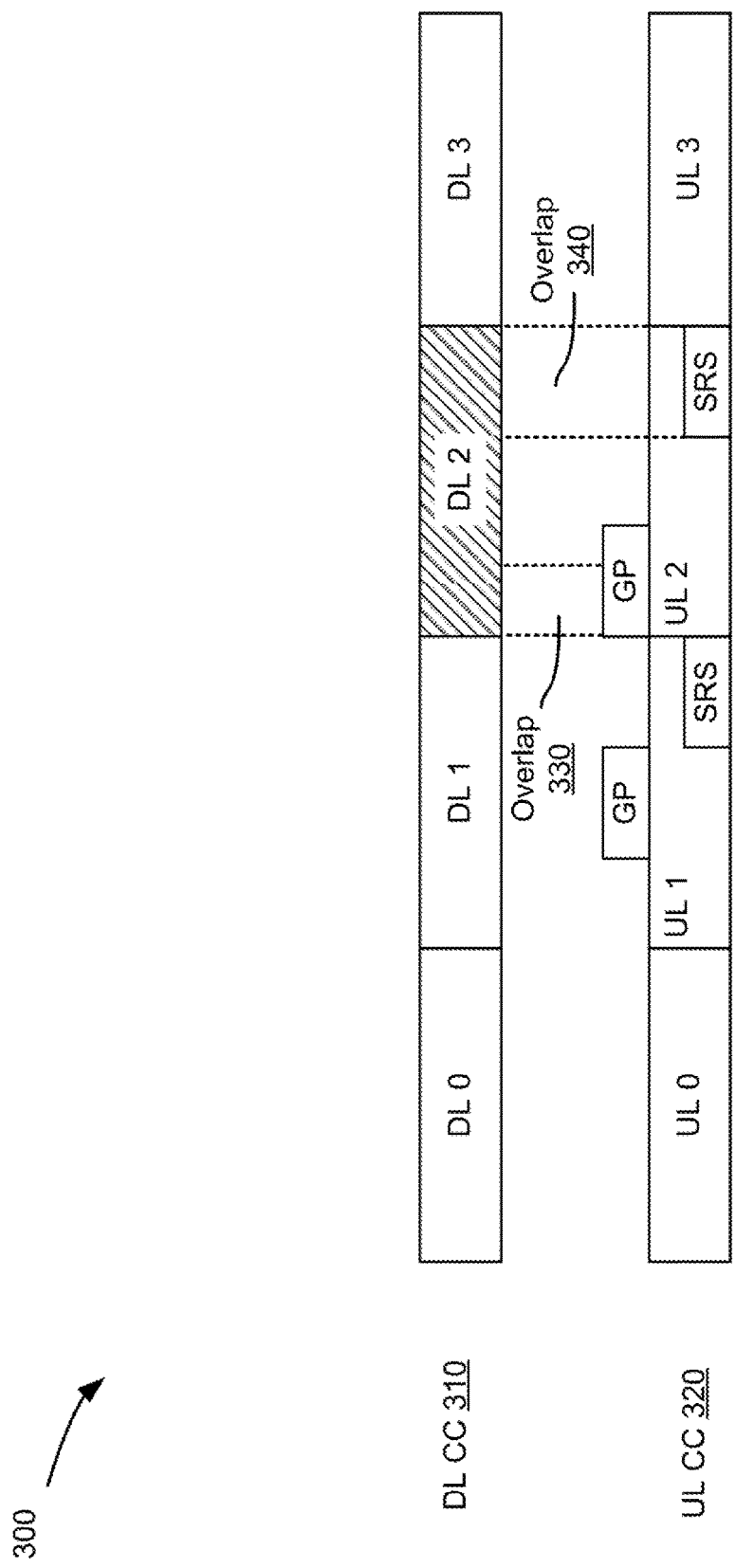
FIG. 3 illustrates an example of controlling an SRS transmission to avoid impacting a downlink (DL) reception or vice versa, in accordance with some embodiments.

FIG. 3 illustrates an example of controlling 300 an SRS transmission to avoid impacting a DL reception or vice versa, in accordance with some embodiments. As illustrated, a DL CC 310 can be used for DL reception, whereby a UE receives traffic, reference signals, and/or control information encoded in symbols of slots of the DL CC 310. An UL CC 320 can be used for UL transmission, whereby the UE transmits traffic, reference signals, and/or control information encoded in symbols of slots of the UL CC 320. The DCL CC 310 and UL CC 320 can be a supported band combination. Each of slots is illustrated with a rectangle and is enumerated with a corresponding number (e.g., "DL 0" refers to "slot 0" on DL CC 310, whereas "UL 0" refers to "slot 0" on the UL CC 320). The downlink slots can belong to a downlink frame, whereas the uplink slots can be long to an uplink frame. In the illustration of FIG. 3, the TA between the uplink frame and the downlink frame is zero.

In an example, the UE can send SRS in the uplink slots, while supporting the SRS Tx antenna port switching capability. In the illustration of FIG. 3, a first SRS (e.g., a first SRS symbol) is transmitted in "UL 1" and a second SRS (e.g., a second SRS symbol) is transmitted in "UL 2." A guard period (shown as "GP" in the figures) is used before and after each SRS (e.g., occupying at least one symbol before and at least one symbol after an SRS symbol). 3GPP TS38.214 V 16.4.0 (2020-12) defines the guard period as "a guard period of Y symbols, in which the UE does not transmit any other signal, in the case the SRS resources of a set are transmitted in the same slot. The guard period is in-between the SRS resources of the set." The value of Y is shown in Table 1 and depends on the numerology of the CC.

TABLE 1

| μ | Δf = $2^\mu \cdot 15$ [kHz] | Y [symbol] |
|---|---|---|
| 0 | 15 | 1 |
| 1 | 30 | 1 |
| 2 | 60 | 1 |
| 3 | 120 | 2 |

In the illustration of FIG. 3, the SRS transmissions at "UL 1" and "UL 2" can impact the DL reception at "DL 2" (as shown with a diagonally dashed slot in the figure). In particular, considering the first SRS in "UL 1," its following guard period falls in "UL 2" (whereby, its preceding guard period is in "UL 1"). Given the zero-TA, "UL 2" is parallel to "DL 2" in the time domain. Because of the SRS Tx antenna port switching, the UE may be adjusting its RF chain in the following guard period, thereby adjusting this RF chain for some time during the DL reception in "DL 2." This time is shown as an overlap 330. Because the RF chain is being adjusted during the overlap 330, the symbols in "DL 2" that would have been processed (e.g., DL signal received, demodulated, decoded, etc.) during this time period would not be successfully processed, thereby impacting the DL reception in "DL 2."

Now, considering the second SRS in "UL 2", this SRS fully overlaps with "DL 2". This overlap is shown as an overlap 340 in FIG. 3. Here also, because of the SRS Tx antenna port switching, the UE may be adjusting its RF chain for the transmission of the second SRS, thereby adjusting this RF chain during the overlap 340 "DL 2." Because the RF chain is being adjusted during the overlap 340, the symbols in "DL 2" that would have been processed (e.g., DL signal received, demodulated, decoded, etc.) during this time period would not be successfully processed, thereby impacting the DL reception in "DL 2."

It is possible to mitigate the impact of the SRS transmission (in light of the SRS Tx antenna port switching capability) to the DL reception. In particular, the UE is scheduled and/or configured to receive high priority DL symbols/slots/occasion from the network (e.g., in "DL 2"), to transmit SRS (e.g., in "UL 1" and "UL 2"), and indicate that its SRS transmission would impact this DL reception. This scheduling or configuration can rely on downlink scheduling information from the network, such as RRC signaling, MAC CE, and/or DCI. The DL reception (e.g., in "DL 2" can be for high priority downlink data, a reference signal for layer 1 or layer 3 measurement, or system information. In particular, "DL 2" can carry ultra-reliable and low latency communications (URLLC) data, RS for L1 or L3 measurement (e.g., SSB, CSI-RS)," and/or system information of DL channels. The scheduling of the SRS transmission can use SRS scheduling information, which can also be RRC signaling, MAC CE, and/or DCL The SRS transmission impact can be indicated to the network by using "txSwitchImpactToRx".

The UE checks whether the DL symbols/slots/occasion overlaps with SRS symbol(s) or the SRS associated guard period(s). This check can be based on the DL scheduling information that indicates to the UE the symbols/slots/occasions of when DL reception is scheduled and on the SRS scheduling information that indicates to the UE the symbols/slots/occasions of when the SRS transmission is scheduled. An overlap exists between an SRS symbol and the DL reception or an associated guard period and the DL reception if their relevant scheduled/configured timings occur in parallel in the time domain. This overlap can be a full overlap (e.g., the timing of the transmission of the SRS symbol or the timing of the guard period can be scheduled within the timing of the DL reception) or a partial overlap (e.g., the overlap is for a relatively shorter time length, where this overlap time length is equal to or larger than a predefined threshold time). Here, a guard period is used and its time length may, but need not, be defined as a function of symbol such as in 3GPP TS38.214 V 16.4.0 (2020-12). For instance, the guard period represents a transient period that is necessary to a UE to complete its RF adjustment for the SRS Tx antenna port switching. This transient period can be shorter than the length of a symbol, such as being about five-hundred milliseconds, or some other value.

It is also possible for the network to determine the overlap, similarly based on the downlink scheduling information and the SRS sounding information. However, in certain situations, the UE may apply a TA given its time synchronization that may not be known to the network. In such situations, the UE may more accurately determine the overlap.

Once the overlap is determined (e.g., by the UE or the network), different approaches to mitigate the DL reception impact are possible. In one approach, the UE can adjust the scheduled transmission (e.g., by using another slot or symbol within the current slot), adjust the transmission itself (e.g., by shortening the guard period), and/or abort the scheduled SRS transmission. Aborting can include any, a combination, or all of muting the scheduled transmission of an SRS symbol (e.g., processing the SRS symbol but not transmitting it), canceling the scheduled transmission (e.g., partially processing and stopping this processing or avoiding the processing altogether), skipping the scheduled transmission (e.g., by applying a hopping pattern), repurposing the symbol (e.g., from being used to send SRS to sending non-SRS), or any other technique that changes the transmission of the SRS such that its impact to the DL reception is avoided altogether or reduced to the shortest possible amount of time (or number of DL symbols).

In another approach, the network can indicate to the UE to adjust the scheduled SRS transmission (in which case, the network can provide updated SRS scheduling information), adjust the scheduled transmission itself (e.g., by indicating a shorter time length to use as a guard period), or abort (e.g., including any of muting, canceling, skipping repurposing, or any other technique). Alternatively or additionally, the network can indicate to the UE to abort (e.g., mute, cancel, skip, repurpose, and/or any other technique that changes the DL reception such that the impact from the SRS transmission is avoided altogether or reduced to the shortest possible amount of time), or that the DL reception is rescheduled (in which case, the network can provide updated DL scheduling information). In this approach, the network may have received an indication of the overlap from the UE or may have determined the overlap on its own based on the downlink scheduling information and the SRS scheduling information.

In both approaches above, if there is no overlap, the SRS transmission does not impact the DL reception. Accordingly, no change to the SRS transmission and/or DL reception may be made. Further, assuming that an overlap exists, no change is made if the DL carries non-high priority traffic, reference signals, or control information.

As explained herein above, the overlap can be partial. To determine that such partial overlap should trigger the change to the SRS transmission and/or DL reception, the time length of the overlap is compared to a predefined threshold time. This predefined threshold time can be stored in a memory of the UE and can be specified by design or in a technical specification. For instance, this predefined threshold time can represent to the transient time needed to complete RF adjustment in support of the SRS Tx antenna port switching. Additionally or alternatively, the threshold time can be indicated by the network to the UE in, for instance, an RRC configuration. Furthermore, the UE can indicate the time length (e.g., in UL information no PUCCH or PUSCH) to the network, whereby the network may compare the time length to the predefined threshold time.

Figure 4:
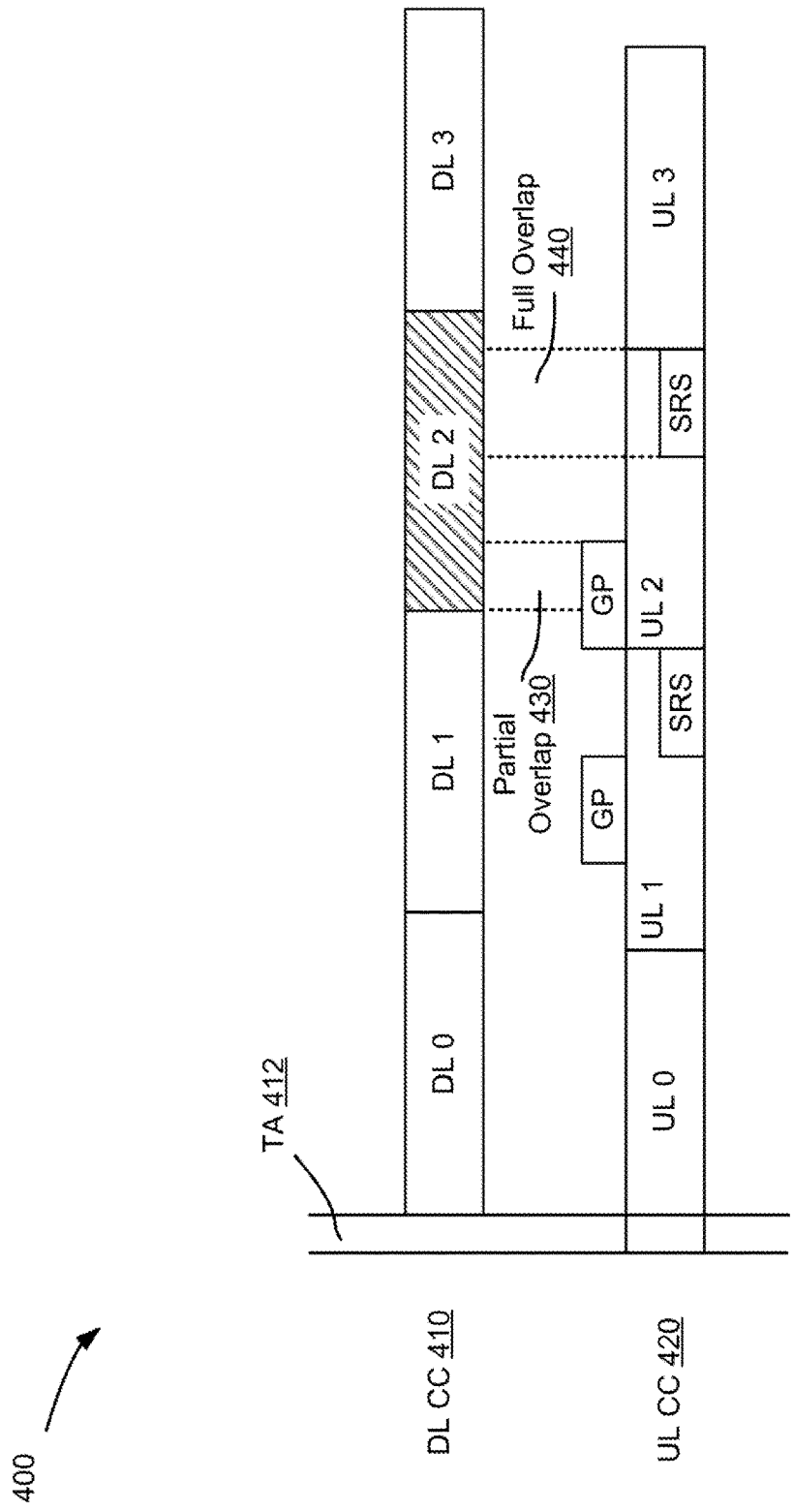
FIG. 4 illustrates another example of controlling an SRS transmission to avoid impacting a DL reception or vice versa, when a non-zero timing advance (TA) is applied to the uplink frame, in accordance with some embodiments.

FIG. 4 illustrates another example of controlling 400 an SRS transmission to avoid impacting a DL reception or vice versa, when a non-zero TA is applied to the uplink frame, in accordance with some embodiments. The controlling 400 may be similar or the same as controlling 300 of FIG. 3, whereby the UE or the network can determine an overlap between SRS transmission and DL reception and the UE can automatically, or upon information from the network, adjust the SRS transmission and/or the DL reception. However here, the illustrated overlap is partial. A reason for this partial overlap can be the non-zero TA.

In the illustration of FIG. 4, a DL CC 410 can be used for DL reception, whereby a UE receives traffic, reference signals, and/or control information encoded in symbols of slots of the DL CC 410. An UL CC 420 can be used for UL transmission, whereby the UE transmits traffic, reference signals, and/or control information encoded in symbols of slots of the UL CC 420. The DCL CC 410 and UL CC 420 can be a supported band combination. Each of slots is illustrated with a rectangle and is enumerated with a corresponding number. The downlink slots can belong to a downlink frame, whereas the uplink slots can be long to an uplink frame. In the illustration of FIG. 4, a TA 412 is used to advance the uplink frame relative to the downlink frame, whereby the UE sends UL symbols in advance of the reception of DL symbols based on a TA command (TAC from the network about the amount of time that the UE needs to advance the UL transmissions.

In an example, the UE can send SRS in the uplink slots, while supporting the SRS Tx antenna port switching capability. In the illustration of FIG. 4, a first SRS (e.g., a first SRS symbol) is transmitted in "UL 1" and a second SRS (e.g., a second SRS symbol) is transmitted in "UL 2." A guard period (shown as "GP" in the figures) is used before and after each SRS (e.g., occupying at least one symbol before and at least one symbol after an SRS symbol).

In the illustration of FIG. 4, the SRS transmissions at "UL 1" and "UL 2" can impact the DL reception at "DL 2" (as shown with a diagonally dashed slot in the figure). In particular, considering the first SRS in "UL 1," its following guard period partially falls in "UL 2" (whereby, its preceding guard period is in "UL 1"). The overlap time is shown as a partial overlap 430. In comparison, the transmission of the second SRS in "UL 2" fully overlaps with "DL 2". This overlap is shown as a full overlap 440 in FIG. 4. In both cases, because the RF chain is being adjusted during the partial overlap 430 or the full overlap 440, the symbols in "DL 2" that would have been processed (e.g., DL signal received, demodulated, decoded, etc.) during would not be successfully processed, thereby impacting the DL reception in "DL 2."

To determine whether the partial overlap 430 should trigger the change to the SRS transmission and/or DL reception as a mitigation process, the time length of the overlap is compared to a predefined threshold time. If exceeding the predefined time threshold, the mitigation process is performed.

Figure 5:
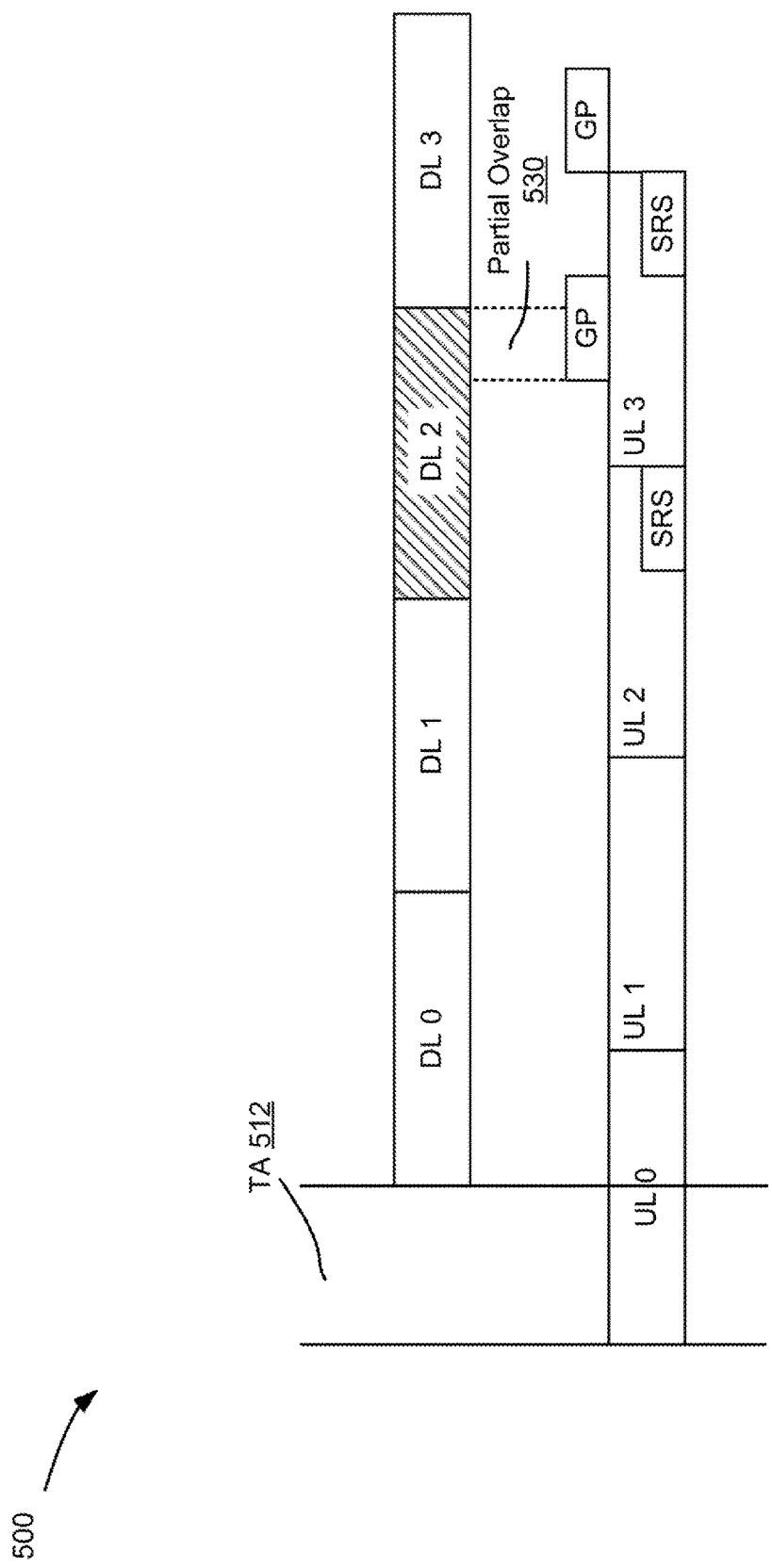
FIG. 5 illustrates yet another example of controlling an SRS transmission to avoid impacting a DL reception or vice versa, when a non-zero TA is applied to the uplink frame, in accordance with some embodiments.

FIG. 5 illustrates yet another example of controlling 500 an SRS transmission to avoid impacting a DL reception or vice versa, when a non-zero TA is applied to the uplink frame, in accordance with some embodiments. The controlling 500 is similar to the controlling 400 of FIG. 4. The similarities are not repeated herein for the purpose of brevity. In FIG. 4, the length TA 412 was shorter than half a slot. As a result, the partial overlap 430 was between a guard period that follows an SRS (e.g., an SRS symbol) in an uplink slot and a DL slot that follows the uplink slot. In comparison, in FIG. 5, the length of the TA 512 is longer than half a slot. Accordingly, a partial overlap 530 exists between a guard period that precedes an SRS (e.g., an SRS symbol) in an uplink slot and a DL slot that also precedes the uplink slot. As such, the mitigation process (e.g., change one or both of the SRS transmission or the DL reception) can apply to not only a DL slot following an UL slot that carries SRS (e.g., as in FIG. 4), but also a DL slot preceding such an UL slot (as in FIG. 5)

Figure 6:
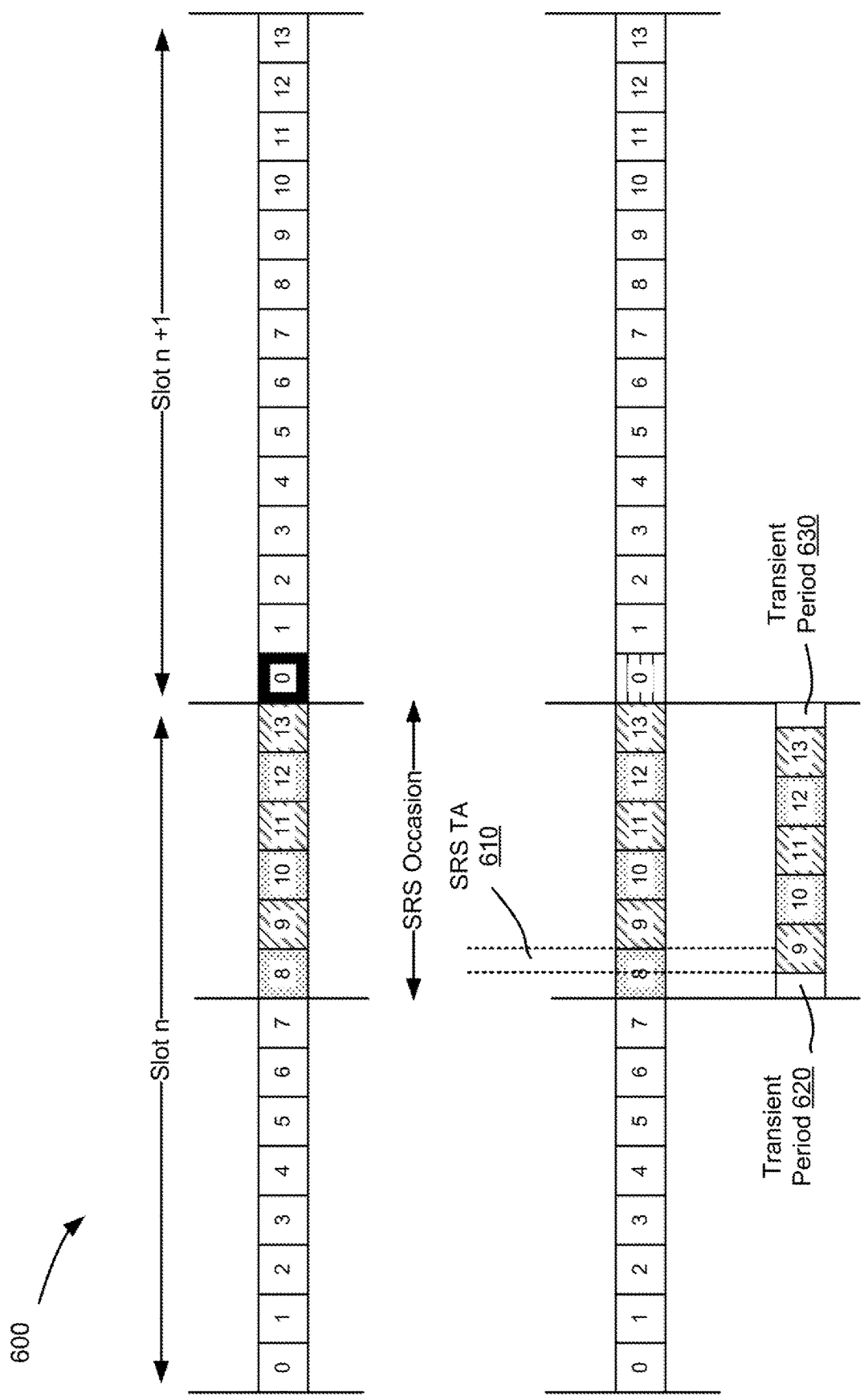
FIG. 6 illustrates an example of using an SRS TA for timing an SRS transmission, in accordance with some embodiments.

FIG. 6 illustrates an example of using 600 an SRS TA for timing an SRS transmission, in accordance with some embodiments. The SRS TRA represents another mitigation process by which the impact of SRS transmission to a next slot on the same UL CC can be reduced or avoided. This mitigation process can be equally applied to reduce or avoid the impact of SRS transmission to DL reception on a DL CC.

In an example, the SRS TA represents a TA that is specific to SRS transmission. In particular, the SRS TA applies to advance (e.g., move forward or delay) the transmission of an SRS symbol or a set of SRS symbols scheduled in a slot, but not to advance the transmission of non-SRS symbols in the same slot or other slots and/or the transmission of another SRS symbol or set of SRS symbols scheduled in another slot (e.g., in an adjacent slot).

Two adjacent slots are illustrated in FIG. 6: "slot n" and "slot n+1" that follows and is adjacent to slot "n." Each of the two slots includes fourteen symbols enumerated with the corresponding symbol numbers (e.g., "symbol 0" being the first symbol in a slot, "symbol 7" being the eighth symbol in the slot, and "symbol 13" being the last symbol in the slot). An SRS occasion represents a set of symbols of a slot usable to transmit one or more SRS symbols. This SRS occasion spans the last six symbols in a slot (e.g., starts at the ninth symbol and ends at the last, fourteenth symbol). The number of SRS symbols to transmit and particular slot locations of such symbols can be configured by the network. Generally, the SRS Tx antenna switching capability can impact this number. For instance, with a 1T4R or 2T4R SRS Tx antenna switching capability, the network may schedule as many SRS symbols as possible in a slot because of this advanced capability may allow the network to determine a relatively larger set of channel information. With the SRS Tx antenna switching capability, a guard period is applied before and after each SRS symbol. As such, in the SRS occasion of six symbols, a maximum of three SRS symbols can be transmitted, where the SRS symbol pairs are separated by a guard period, and where a first guard period precedes the first SRS symbol and a last guard period follows the last SRS symbol.

In the illustration of FIG. 6, a particular distribution of SRS symbols in the first "slot n" is shown. This distribution includes three SRS symbols (shown with diagonally dashed squares, located at "symbol 9," "symbol 11," and "symbol 13" of "slot n"). A guard period distribution is also needed and includes four guard periods. The first three guard periods are in "slot a" (shown with dotted squares, located at "symbol 8," "symbol 10." and "symbol 12" of "slot n"). The last guard period follows the last SRS symbol that is at "symbol 13" of "slot n" and, thus, this last guard period is in the adjacent slot (shown with a dark, solid square, located at "symbol 0" of "slot n+1").

According to the above distributions of SRS symbols and needed guard periods, a guard period of an SRS transmission in a UL slot (e.g., "slot n") can impact the transmission (SRS or non-SRS) on an adjacent UL slot (e.g., "slot n+1"). In particular, the last guard of the SRS transmission in the first "slot n" falls in the first symbol in the adjacent "slot n+1." As a result, the UE cannot transmit a symbol in the first symbol of "slot n+1." Of course, this impact to the UL transmission on the adjacent slot depends on the length of the guard period. With a longer guard period (e.g., two-symbol long), the impact may become more severe.

Furthermore, this impact is not limited to only when three SRS symbols are scheduled for transmission in a slot. For instance, this impact also occurs when only one SRS symbol is scheduled for transmission in the last symbol of "slot n."

The use of an SRS TA 610 can mitigate this impact. In particular, the UE advances (e.g., moves forward as in FIG. 6, or delays as in FIG. 7) the SRS symbol transmission by the SRS TA 610 such that a guard period does not extend to the first symbol of the adjacent "slot n+1". By doing so, this first symbol in the "adjacent slot n+1" (shown in FIG. 6 with a horizontally dashed square) is no longer impacted by the last SRS symbol in the "slot n" and becomes usable for UL transmission.

In an example, the length of the SRS TA 610 is shorter than a guard period (e.g., half, or some other fraction or percentage, of its length). The first occurring guard period (e.g., the one that would have been located at "symbol 8" of "slot n") is replaced with or shortened to a transient period 620. Likewise, the last occurring guard period (e.g., the one that would have been located at "symbol 0" of "slot n+1") is replaced with or shortened to a transient period 630. A transient period (e.g., 620 or 630) has a time length that is equal to or longer than the UE-needed time for RF adjustment in support of SRS Tx antenna port switching and that is shorter than a time length of a typical guard period. When the SRS TA 610 is half of the guard period, the transient periods 620 and 630 are equal to each other. Otherwise, the transient periods 620 and 630 are not equal, but their sum equals the time length of the guard period.

Different approaches are possible to define the SRS TA 610. In one approach, the SRS TA 610 is predefined as the difference between the guard period and the actual transient period for the UE to complete RF adjustment. This predefined time value can be stored in a memory of the UE and can be specified by design or in a technical specification. In another approach, the network can configure the SRS TA 610 for the UE. This network-based approach can involve one or more sub-approaches. In a first sub-approach, the network can configure a set of candidate SRS TAs for the UE. Upon determining that the scheduled SRS transmission in a slot impacts the next slot (or, as in the above figures, the DL reception), the network can indicate a particular SRS TA from the set to the UE for the UE to use as the SRS TA 610. Here, the network can determine the impact based on SRS scheduling information that schedules the SRS transmission in "slot n" and other scheduling information (e.g., that schedules UL transmission in "slot n+1" or the DL reception). Additionally or alternatively, the UE can determine the impact based on the SRS scheduling information and the other scheduling information can indicate the impact to the network (e.g., in UL control information). The initial configuration of the set of candidate SRS TAs can be via RRC signaling, MAC CE, and/or DCI. The subsequent indication of the particular SRS TA 610 can also be via RRC signaling, MAC CE, and/or DCI. In another sub-approach, the initial configuration may be skipped. Instead, the network can directly indicate (e.g., without the indication of the set of SRS TAs) the SRS TA 610 to use upon determining (locally or based on an indication from the UE) of the impact. Here also, this indication can be via RRC signaling. MAC CE, and/or DCI.

In these various approaches, the SRS TA 610 can be defined to have a length of {+(x %*symbol length), -(x %*symbol length), 0} "x" is a positive value (e.g., fifty, to result in a fifty percent multiplier). A positive length (e.g., +(x %*symbol length)) is used to advance, as in FIG. 6. A negative length (e.g., -(x %*symbol length)) is used to delay, as in FIG. 7. A zero length is used in case no TA advancing or delaying is needed. The symbol length is based on SRS subcarrier spacing (SCS), a PUCCH SCS, or a PUSCH SCS. Further, when predefined for the UE or configured by the network, the SRS TA 610 can be set per SRS resource, per SRS resource set, per UE, per CC, per serving cell, or per SCS.

Different approaches are also possible to use the SRS TA 610. In one approach, the UE determines the applicable SRS TA 610 (whether from a predefined set of candidate SRS TAs or from a network-configured set of candidate SRS TAs). To do so, the UE can rely on a set of rules implemented in logic stored in a memory of the UE and executed by a processor of the UE. This logic can be specified by design or in a technical specification. The rules can consider the location of an SRS symbol scheduled for transmission in a slot, the number of SRS symbols that are scheduled for transmission in a slot, and priority of a DL reception.

In an example of the symbol location rule, if the SRS symbol is adjacent to another symbol of a UL channel (e.g. UL CC) in the same slot or an adjacent slot, the UE determines that an SRS TA is applicable. If the SRS symbol is before the other symbol (e.g., "SRS symbol 13" in "slot n+1" being before the "symbol 0" in "slot n+1"), the SRS TA is used to advance the SRS symbol transmission by "Y" milliseconds (e.g. "Y" is equal to the difference between the guard period and the transient period 620). Otherwise, this SRS symbol is after the other symbol. In this case (as further illustrated in FIG. 7), the SRS TA is used to delay the SRS symbol transmission by "Y" milliseconds.

In an example of the number of symbols rule, if this number is larger than a predefined threshold number (e.g., two), the UE determines that there will be an impact due to the guard period and, thus, the SRS TA is applicable. Whether to advance or delay depends on either the SRS symbol location or the guard period location. If the SRS symbol is the last symbol in the slot or the SRS occasion (or, similarly, the guard period is the first symbol in the adjacent slot), the transmission of the SRS symbols is advanced by "Y" milliseconds. In comparison (and as further illustrated in FIG. 7), if the SRS symbol is the ninth symbol in the slot or the first symbol in the SRS occasion (or, similarly, the guard period is the eighth symbol in that same slot), the transmission of the SRS symbols is delayed by "Y" milliseconds.

In an example of the DL reception rule, upon determining that a DL slot is impacted (e.g., as illustrated in connection with FIGS. 3-5), the UE determines if the SRS transmission is scheduled to occur before or after the DL reception. If before, the transmission of the SRS symbols is advanced by "Y" milliseconds. Otherwise, the transmission of the SRS symbols is delayed by "Y" milliseconds. A similar UL transmission rule can be defined. In particular, if a guard period of an SRS symbol transmitted in a slot overlaps with UL transmission that uses another slot, the SRS TA applies. The other slot can be an adjacent slot on the same UL CC or another UL CC.

Figure 7:
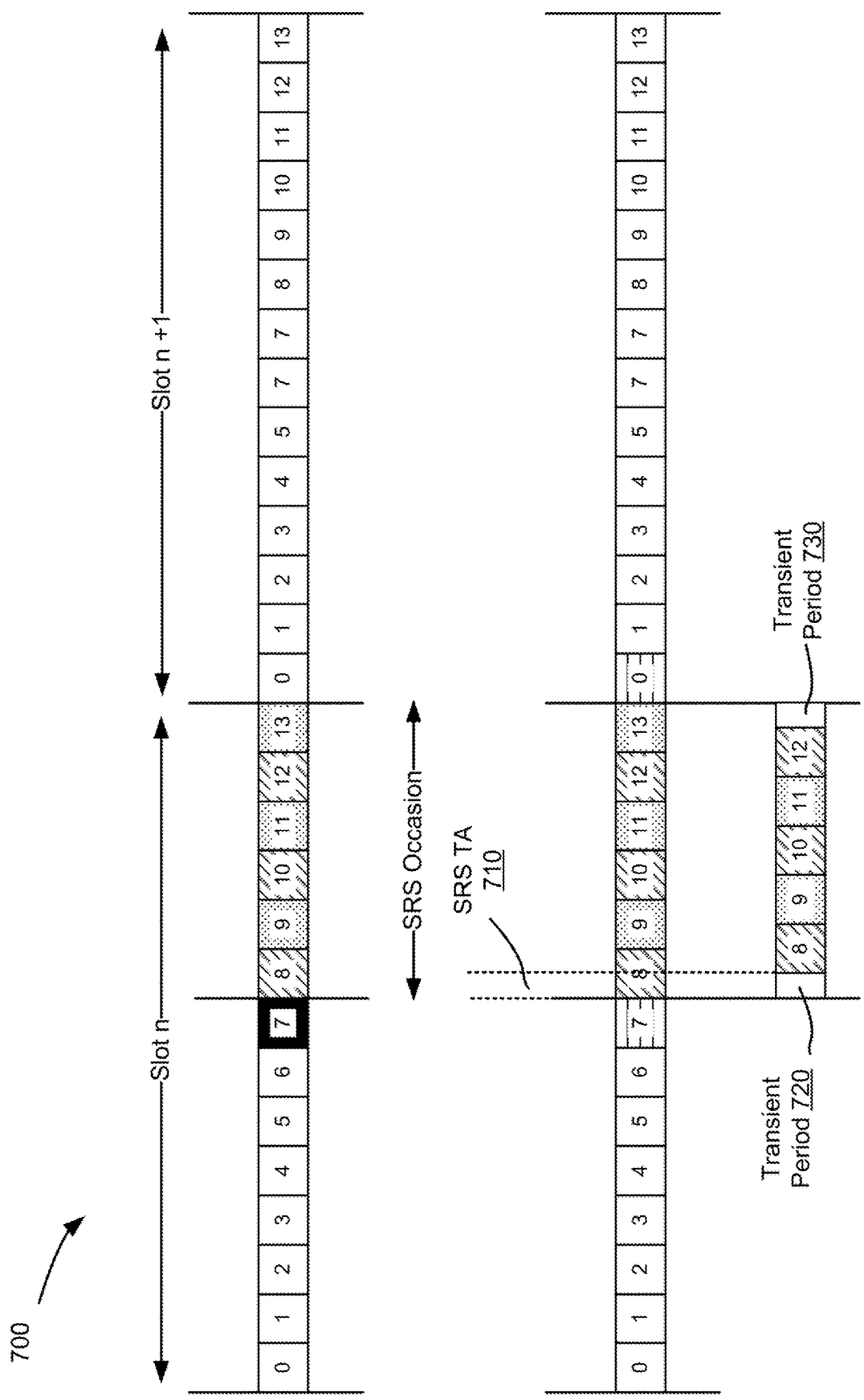
FIG. 7 illustrates another example of using an SRS TA for timing an SRS transmission, in accordance with some embodiments.

FIG. 7 illustrates another example of using 700 an SRS TA 710 for timing an SRS transmission, in accordance with some embodiments. The SRS TA 710 and the set-up are similar to the SRS 610 and set-up of FIG. 6. The similarities are not repeated herein for the purpose of brevity. In FIG. 7, rather than advancing the SRS transmission, this SRS transmission is delayed by the SRS TA 710 because the impact of the SRS transmission is to the part of "slot n" outside of the SRS occasion of this slot.

In the particular illustration of FIG. 7, the distribution of SRS symbols in the first "slot n" includes three SRS symbols (shown with diagonally dashed squares, located at "symbol 8," "symbol 10," and "symbol 12" of "slot n"). A guard period distribution is also needed and includes four guard periods. All four guard periods are in "slot n." The last three guard periods are with the SRS occasion in "slot n" (shown with dotted squares, located at "symbol 9," "symbol 11," and "symbol 13" of "slot n"). However, the first guard period is outside of the SRS occasion and is located in the eighth symbol (e.g., "symbol 7" of "slot n," show with a dark, solid square). Thus, this guard period impacts the use of the symbols of "slot n" that are outside of the SRS occasion, where these symbols are usable for non-SRS transmission. Depending on the actual length of the guard period, this impact is at last one symbol (e.g., at least "symbol 7" is not usable for UL transmission).

Furthermore, this impact is not limited to only when three SRS symbols are scheduled for transmission in a slot. For instance, this impact also occurs when only one SRS symbol is scheduled for transmission in the first symbol of the SRS occasion (e.g., "symbol 8" of "slot n").

The use of the SRS TA 710 can mitigate this impact. In particular, the UE delays the SRS symbol transmission by the SRS TA 710 such that a guard period does not extend to the seventh symbol of "slot n." By doing so, this seventh symbol (shown in FIG. 7 with a horizontally dashed square) is no longer impacted by the first SRS symbol in the SRS occasion of "slot n" and becomes usable for UL transmission.

In an example, the length of the SRS TA 710 is shorter than a guard period (e.g., half, or some other fraction or percentage, of its length). The first occurring guard period (e.g., the one that would have been located at "symbol 7" of "slot n") is replaced with or shortened to a transient period 720. Likewise, the last occurring guard period (e.g., the one that would have been located at "symbol 13" of "slot n") is replaced with or shortened to a transient period 730.

Referring back to FIGS. 3-7, the UE can indicate, to the network, its capability to support SRS TA, where this capability can be indicated in support of or in conjunction with its capability for SRS Tx antenna port switching. This indication can be sent in UE capability information. The UE capability information can indicate the support or lack thereof and, optionally, the supported set of candidate TAs. The capability can also be indicated as being available per SRS resource, per SRS resource set, per UE, per CC, per serving cell, or per SCS. The controlling 300, 400, and 50 of FIGS. 3-5 and the SRS TAs 610 and 710 of FIGS. 6-7 can be used in conjunction or independently of each other. In one example, upon the UE reporting the SRS TA capability to the network, if this SRS TA capability is not supported, the UE can by default use the controlling 300, 400, and 500 of FIGS. 3-5. In comparison, if the capability is supported, the controlling 300, 400, 500 is used by default, unless otherwise indicated by network to use the SRS TA, or, alternatively, the SRS TA capability is used by default unless otherwise indicated by network to use the controlling 300, 400, 500.

Figure 8:
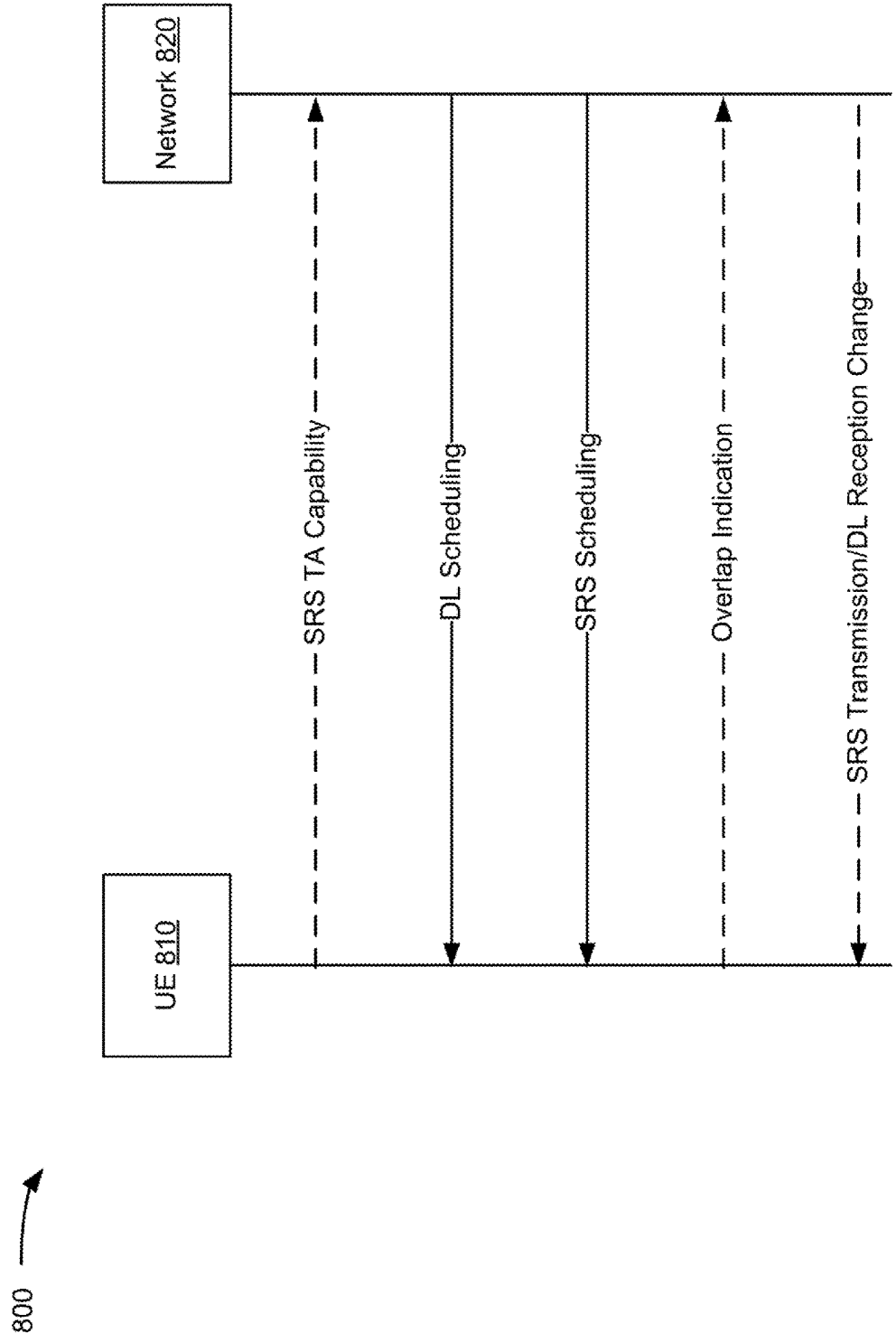
FIG. 8 illustrates an example of a sequence diagram between a user equipment (UE) and a network for controlling an SRS transmission to avoid impacting a DL reception or vice versa, in accordance with some embodiments.

FIG. 8 illustrates an example of a sequence diagram 800 between a UE 810 a network 820 for controlling an SRS transmission to avoid impacting a DL reception or vice versa, in accordance with some embodiments. Communications between the UE 810 and the network 820 can be carried via one or more base stations of the network 820 and/or one or more component carriers of such base station (s).

In an example, the sequence diagram 800 includes the UE 810 sending, to the network 820, information about its SRS TA capability. For instance, this information can be sent in a UE capability information and can indicate whether the UE supports SRS TA in conjunction with SRS Tx antenna port switching, as described herein above. As illustrated with the dashed arrow, the sending of this information may be optional. If sent, the network 820 may determine whether the UE 810 supports SRS TA and, if so, may configure a set of candidate SRS TAs for the UE 810. This set can be used separately or in conjunction with a change to SRS transmission or DL reception, where the change is further described in the next steps of the sequence diagram 800. If unsupported, the change to the change to SRS transmission or DL reception can be the default behavior that the network 820 expects the UE 810 to support.

The sequence diagram 800 also includes the network 820 sending DL scheduling information to the UE 810. This information indicates a set of symbols/slots/occasions for DL reception by the UE 810. In addition, the information can indicate the priority of the DL reception (e.g., high priority for URLLC data, system information, or reference signals). In addition, the network 820 sends SRS scheduling information to the UE 810. This information indicates a set of symbols/slots/occasions for the transmission of SRS symbols by the UE 810.

In an example, and as shown with the dashed arrow as an optional step, the sequence diagram 800 further includes the UE 810 sending an overlap indication to the network 820. For instance, the UE determines an overlap between a scheduled DL reception and a scheduled SRS transmission. The overlap may be full or partial and can include an overlap between a guard period and the scheduled DL reception. The indication can identify, to the network, the time length or number of symbols of the overlap between the SRS symbol and the DL reception or between the SRS symbol's guard period and the DL reception. This determination is based on the DL scheduling information and the SRS scheduling information. If so, the UE 810 sends the indication of the overlap. In another illustration, no indication is sent. Instead, the UE 810 can automatically perform a change to the scheduled SRS transmission, such as by rescheduling this transmission, changing a parameter of the transmission (e.g., using a transient time for the SRS Tx antenna port switching rather than the guard period, using an SRS TA if supported, etc.), or aborting the SRS transmission. In yet another illustration, the UE 810 does not send the overlap indication. Instead, the network 820 itself determines the overlap based on the DL scheduling information and the SRS scheduling information.

In a further example, and as shown with the dashed arrow as an optional step, the sequence diagram 800 also includes the network 820 sending information about a change to the SRS transmission and/or DL reception. This information can be sent upon the network 820 determining the overlap locally or based on receiving the related information from the UE 810. In both cases, the network 820 can indicate to the UE 810 whether to reschedule the SRS transmission, change a parameter of the SRS transmission, or abort the SRS transmission and/or whether the DL reception is rescheduled, a parameter of the DL reception is changed (e.g., a DL symbol is no longer used, but remaining SL symbols are unaffected), and/or abort the DL reception.

Figure 9:
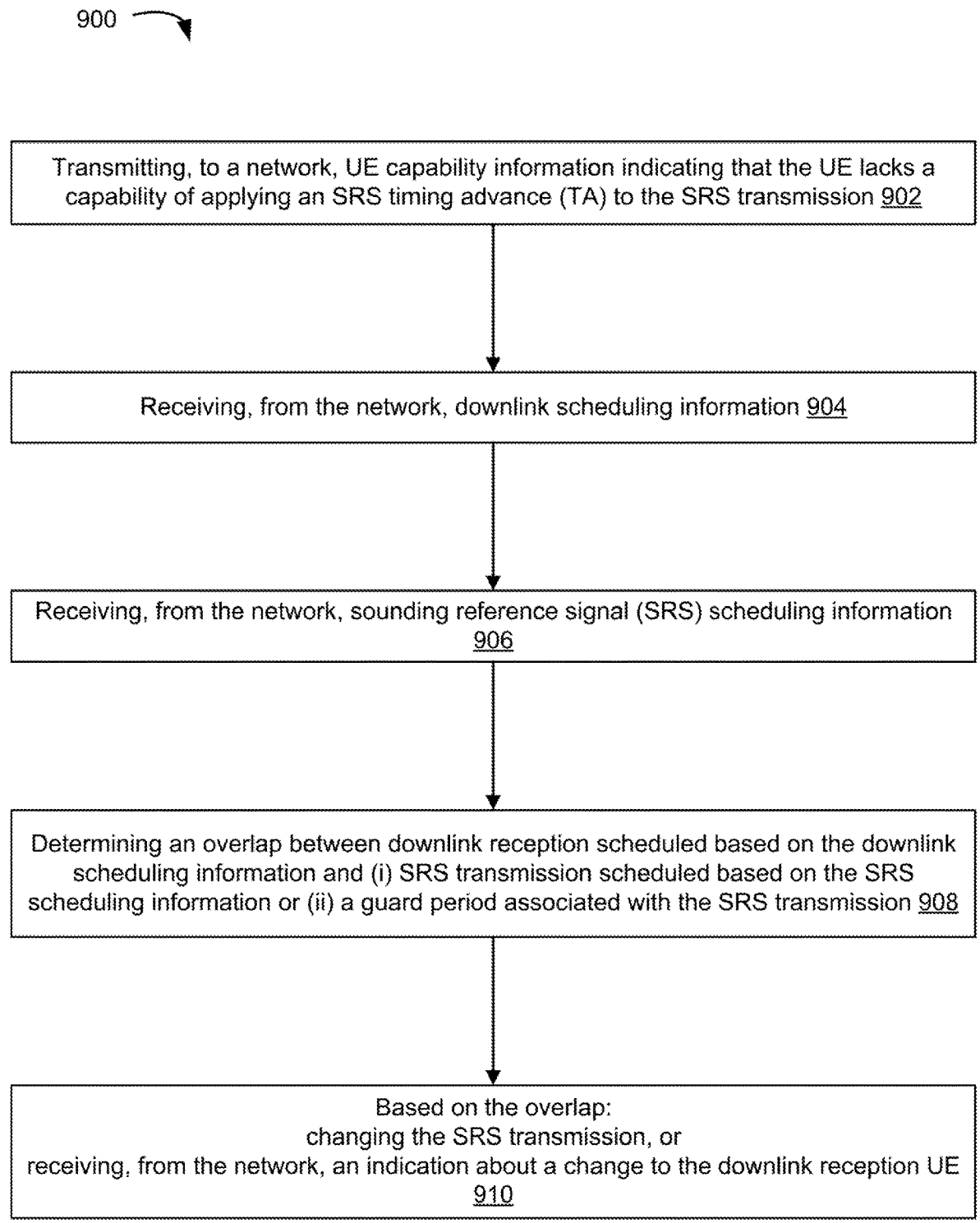
FIG. 9 illustrates an example of an operational flow/algorithmic structure for controlling SRS transmission and/or DL reception, in accordance with some embodiments, in accordance with some embodiments.

FIG. 9 illustrates an example of an operational flow/algorithmic structure 900 for controlling SRS transmission and/or DL reception, in accordance with some embodiments. A UE can implement the operational flow/algorithmic structure 900 to avoid or reduce the impact to the DL reception, when the impact is due to the UE capability for SRS Tx antenna port switching. The operation flow/algorithmic structure 900 may be performed or implemented by the UE such as, for example, the UE 104, 810, 1500, or components thereof, for example, processors 1504. The UE can communicate with a network by being communicatively coupled with one more base stations via one or more uplink CCs and one or more DL CCs.

The operation flow/algorithmic structure 900 may include, at 902, transmitting, to a network, UE capability information indicating that the UE lacks a capability of applying an SRS TA to the SRS transmission. This operation may be optional. If this operation is performed, the UE indicates to the network that it does not supports SRS TA in conjunction with its capability for SRS Tx antenna port switching and the UE can default to mitigating any overlap between SRS transmission and DL reception by applying a change to either or both the SRS transmission or the DL reception (where the change to the SRS transmission does not include an SRS TA).

The operation flow/algorithmic structure 900 may include, at 904, receiving, from the network, downlink scheduling information. This information indicates a set of symbols/slots/occasions for DL reception by the UE and can be sent via RRC signaling, MAC CE, and/or DCI.

The operation flow/algorithmic structure 900 may include, at 906, receiving, from the network, SRS scheduling information. This information indicates a set of symbols/slots/occasions for SRS transmission by the UE and can be sent via RRC signaling, MAC CE, and/or DCI.

The operation flow/algorithmic structure 900 may include, at 908, determining an overlap between downlink reception scheduled based on the downlink scheduling information and (i) SRS transmission scheduled based on the SRS scheduling information or (ii) a guard period associated with the SRS transmission. For example, given a TA (non-SRS TA) between a downlink frame and an uplink frame, and given a scheduled SRS symbol transmission in a slot of the uplink frame and the related guard period applied in support of the SRS Tx antenna port switching, the UE determines whether the SRS and/or the guard period partially or fully overlap with a DL slot (or a DL symbol within this slot) of the downlink frame. For a full overlap, a mitigation process can be triggered to avoid or reduce the impact to the DL reception. For a partial overlap, its time length can be compared to a predefined threshold time. When the time length is larger than this threshold time, the mitigation process can be triggered.

The operation flow/algorithmic structure 900 may include, at 910, based on the overlap: changing the SRS transmission, or receiving, from the network, an indication about a change to the downlink reception UE. For example, the mitigation process is implemented locally on the UE where the UE automatically reschedules the SRS transmission (by sending a related request to the network), changes a parameter of the SRS transmission, or abort the SRS transmission. In another example, the mitigation process is distributed between the UE and the network. In this example, the UE sends an indication about the overlap to the network and the network responds with information about changing the SRS transmission and/or the DL reception.

Figure 10:
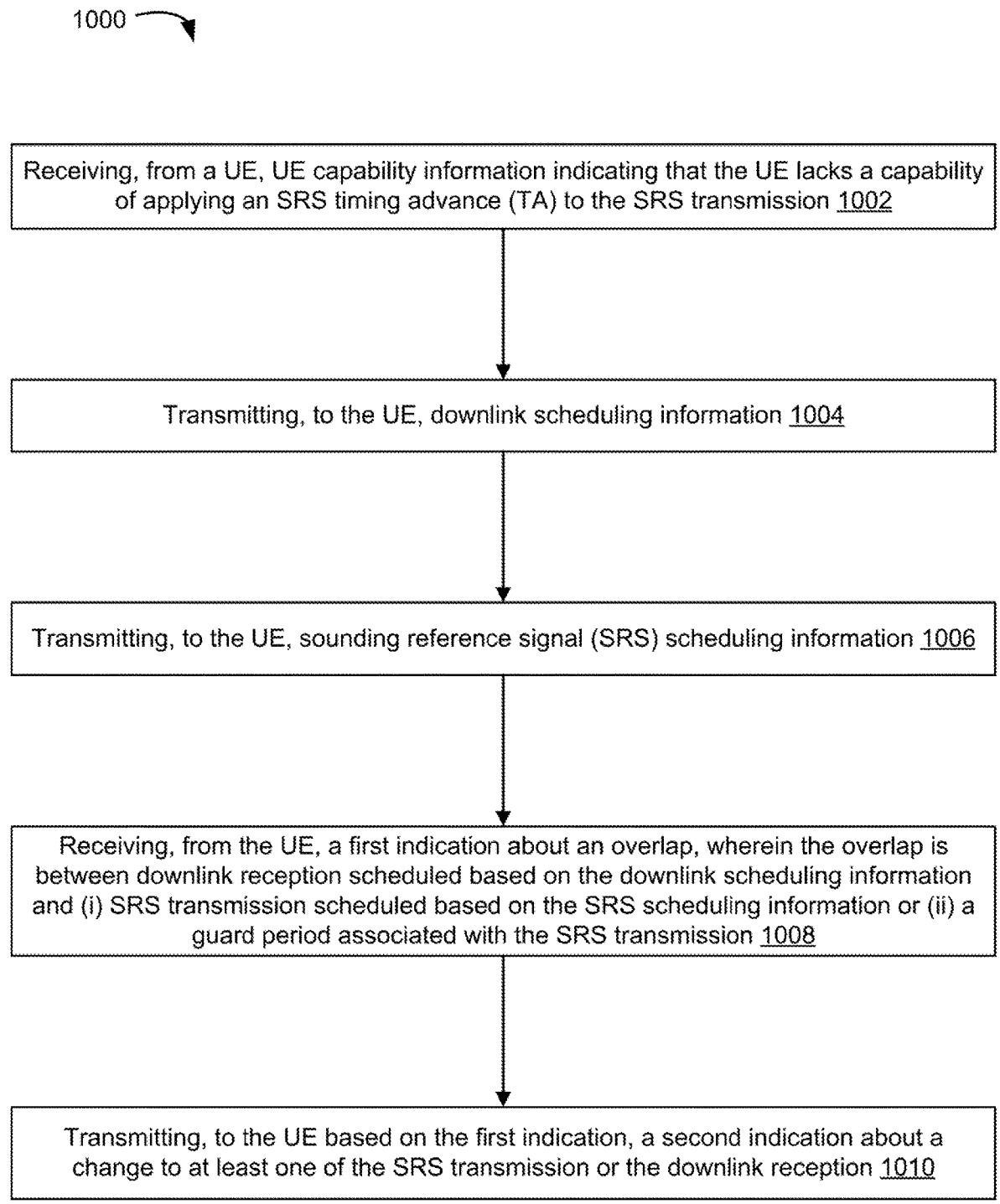
FIG. 10 illustrates another example of an operational flow/algorithmic structure for controlling SRS transmission and/or DL reception, in accordance with some embodiments.

FIG. 10 illustrates another example of an operational flow/algorithmic structure 1000 for controlling SRS transmission and/or DL reception, in accordance with some embodiments. A base station can implement the operational flow/algorithmic structure 1000 to avoid or reduce an impact to the DL reception, when the impact is due to a UE capability for SRS Tx antenna port switching. The operation flow/algorithmic structure 900 may be performed or implemented by the base station such as, for example, the gNB 108, a base station of the network 820, or gNB 1600, or components thereof, for example, processors 1604. The base station can be communicatively coupled with a UE via one or more uplink CCs and one or more DL CCs.

The operation flow/algorithmic structure 1000 may include, at 1002, receiving, from a UE, UE capability information indicating that the UE lacks a capability of applying an SRS timing advance (TA) to the SRS transmission. This operation may be optional. If this operation is performed, the UE capability information that the UE does not supports SRS TA in conjunction with its capability for SRS Tx antenna port switching and the UE can default to mitigating any overlap between SRS transmission and DL reception by applying a change to either or both the SRS transmission or the DL reception (where the change to the SRS transmission does not include an SRS TA).

The operation flow/algorithmic structure 1000 may include, at 1004, transmitting, to the UE, downlink scheduling information. This information indicates a set of symbols/slots/occasions for DL reception by the UE and can be sent via RRC signaling, MAC CE, and/or DCI.

The operation flow/algorithmic structure 1000 may include, at 1006, transmitting, to the UE, SRS scheduling information. This information indicates a set of symbols/slots/occasions for SRS transmission by the UE and can be sent via RRC signaling, MAC CE, and/or DCI.

The operation flow/algorithmic structure 1000 may include, at 1008, receiving, from the UE, a first indication about an overlap. The overlap is between downlink reception scheduled based on the downlink scheduling information and (i) SRS transmission scheduled based on the SRS scheduling information or (ii) a guard period associated with the SRS transmission. This operation may be optional as the overlap may be instead determined by the base station (or the network).

The operation flow/algorithmic structure 1000 may include, at 1010, transmitting, to the UE based on the first indication, a second indication about a change to at least one of the SRS transmission or the downlink reception. In an example, this transmission is part of a mitigation process. The change can indicate that the SRS transmission and/or DL reception are rescheduled, a change to a parameter of the SRS transmission and/or DL reception, and/or an abortion of the SRS transmission and/or DL reception.

Figure 11:
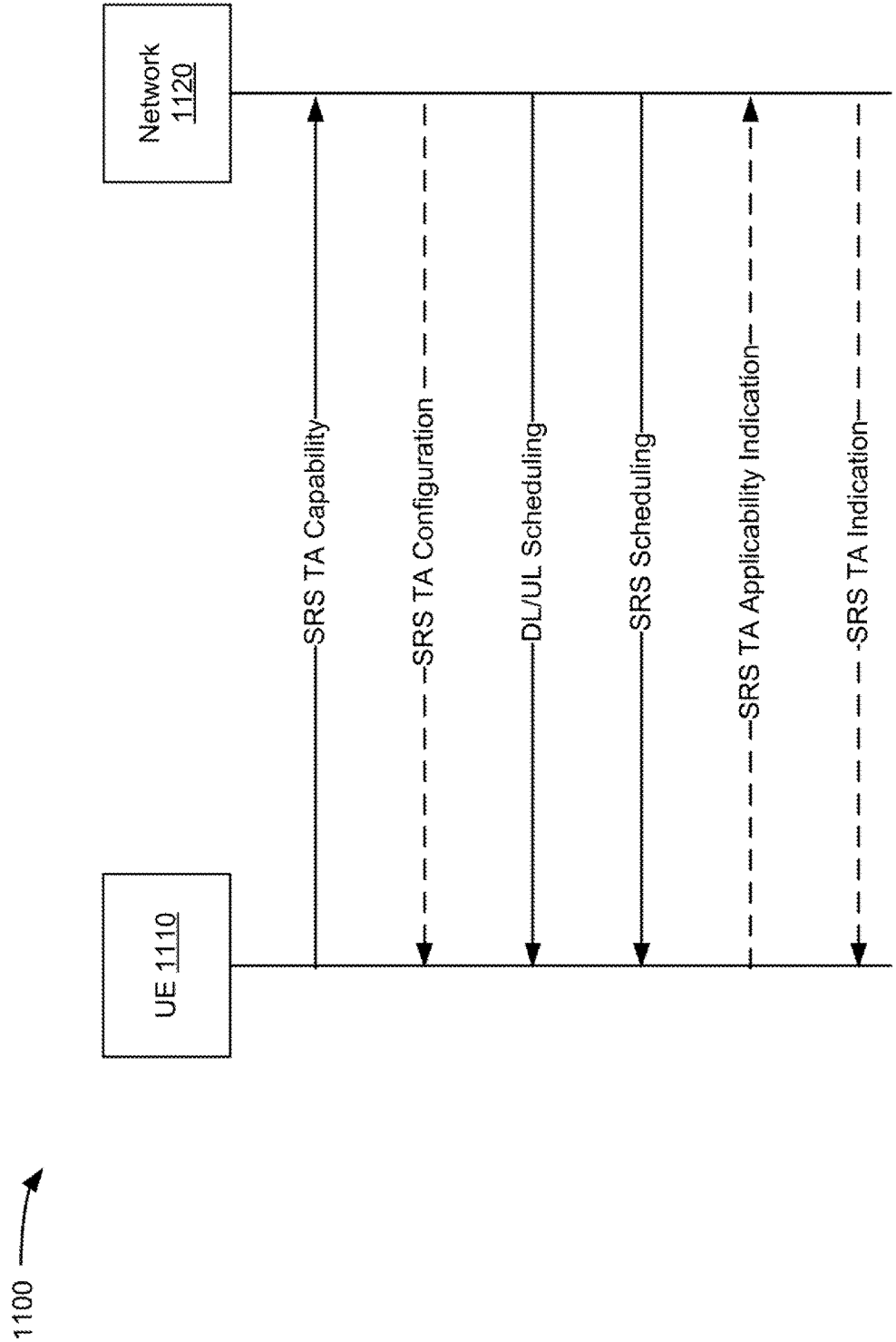
FIG. 11 illustrates an example of a sequence diagram between a UE and a network for timing an SRS transmission based on an SRS TA, in accordance with some embodiments.

FIG. 11 illustrates an example of a sequence diagram 1100 between a UE 1110 and a network 1120 for timing an SRS transmission based on an SRS TA, in accordance with some embodiments. Here, the UE 1110 supports the SRS TA capability. Communications between the UE 1110 and the network 1120 can be carried via one or more base stations of the network 1120 and/or one or more component carriers of such base station(s).

In an example, the sequence diagram 1100 includes the UE 1110 sending, to the network 1120, information about its SRS TA capability. For instance, this information can be sent in a UE capability information and can indicate whether the UE supports SRS TA in conjunction with SRS Tx antenna port switching, as described herein above. Next, and as illustrated with a dashed arrow as an optional step, the network 1120 can optionally configure a set of candidate SRS TAs for the UE 1110 and send information about this set (e.g., the length of each of these candidate SRS TAs, applicable SRS resources, applicable SRS resource sets, applicable CCs, applicable serving cells, applicable SCS, etc.). This configuration information can be sent via RRC signaling.

The sequence diagram 1100 also includes the network 1120 sending DL and/or UL scheduling information to the UE 1110. This information indicates a set of symbols/slots/occasions for DL reception and/or UL by the UE 810. Further, as part of or separately from this scheduling, the network 1120 can also send SRS scheduling information to the UE 1110.

In an example, and as illustrated with a dashed arrow as an optional step, the UE sends an about SRS TA applicability to the network. Here, the UE is configured with multiple candidate SRS TAs and determines that the DL reception (e.g., per FIGS. 3-5) and/or UL transmission (in a slot adjacent to the slot carrying one or more SRS symbols per FIG. 6 or in the same slot carrying the SRS symbol(s) per FIG. 7) are impacted by the SRS transmission. In this case, the UE can indicate to the network that an SRS TA needs to be applied (e.g., via control information on a UL CC). The UE 1110 indicates, to the network, the overlap itself (e.g., the time length or number of symbols of the overlap between the SRS symbol and the DL reception or between the SRS symbol's guard period and the DL reception or UL transmission). In turn, the UE 1110 receives from the network 1120, as shown with the last dashed arrow, an indication of the specific SRS TA to use from the candidate SRS TAs (e.g., via a MAC CE or DCI). In other situations, the network 1120 does not configure the set of candidate SRS TAs. Instead, upon receiving the SRA TA applicability indication, the network indicates the SRS TA to use to the UE 1110. Alternatively, no SRS TA configuration may be made or if one is made, the UE 1110 may be pre-programmed to determine a specific SRS TA to use.

Figure 12:
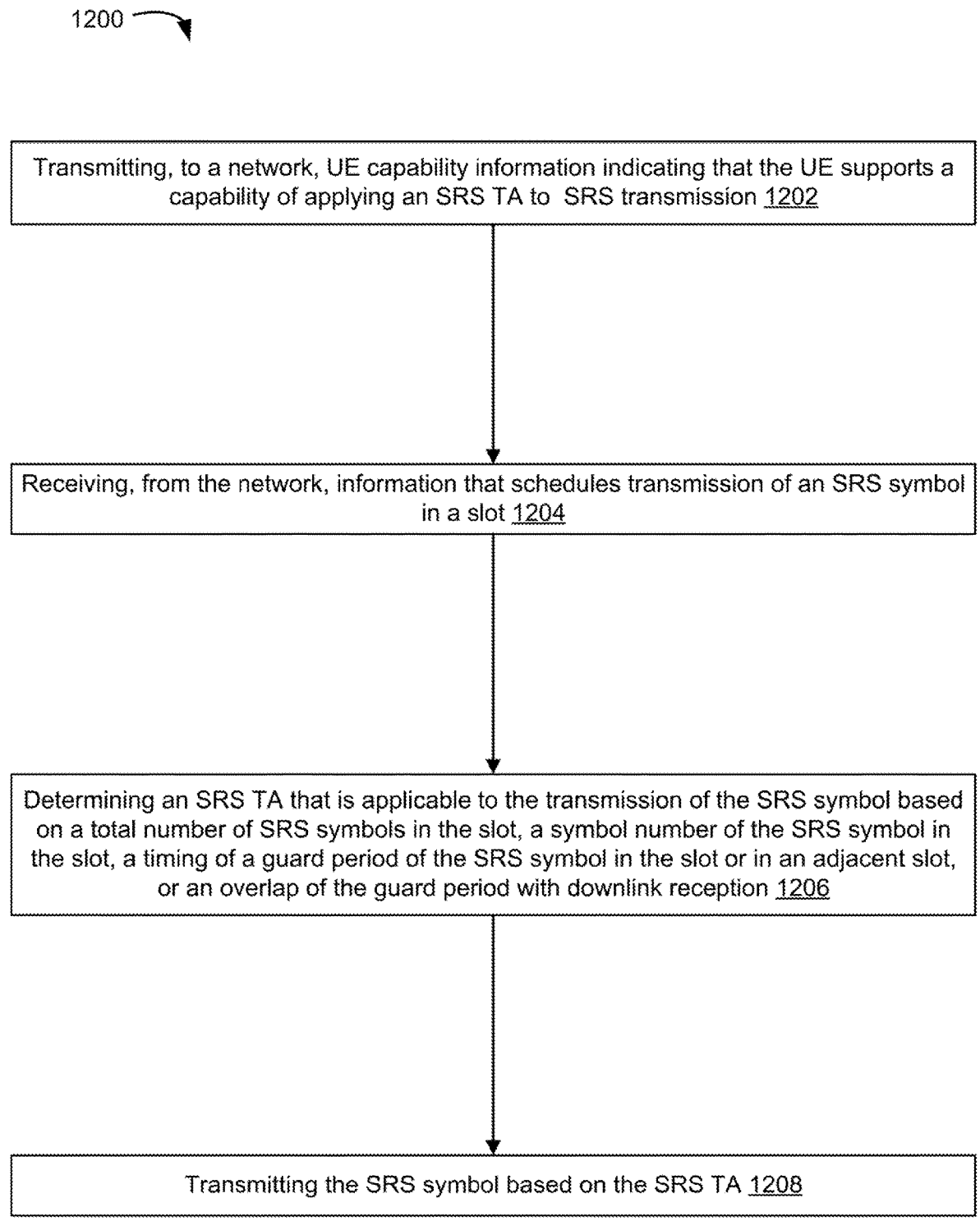
FIG. 12 illustrates an example of an operational flow/algorithmic structure for timing an SRS transmission based on an SRS TA, in accordance with some embodiments.

FIG. 12 illustrates an example of an operational flow/algorithmic structure 1200 for timing an SRS transmission based on an SRS TA, in accordance with some embodiments. A UE can implement the operational flow/algorithmic structure 1200 to avoid or reduce the impact to DL reception and/or UL transmission, when the impact is due to the UE capability for SRS Tx antenna port switching. The operation flow/algorithmic structure 1200 may be performed or implemented by the UE such as, for example, the UE 104, 810, 1500, or components thereof, for example, processors 1504. The UE can communicate with a network by being communicatively coupled with one more base stations via one or more uplink CCs and one or more DL CCs.

The operation flow/algorithmic structure 1200 may include, at 1202, transmitting, to the network, UE capability information indicating that the UE supports a capability of applying an SRS TA to SRS transmission. This capability can be indicated as being related to the UE capability for SRS Tx antenna port switching.

The operation flow/algorithmic structure 1200 may include, at 1204, receiving, from the network, information that schedules transmission of an SRS symbol in a slot. This information can be SRS scheduling information indicating symbols/slots/occasions for SRS transmission by the UE and can be sent via RRC signaling, MAC CE, and/or DCI.

The operation flow/algorithmic structure 1200 may include, at 1206, determining an SRS TA that is applicable to the transmission of the SRS symbol based on a total number of SRS symbols in the slot, a symbol number of the SRS symbol in the slot, a timing of a guard period of the SRS symbol in the slot or in an adjacent slot, or an overlap of the guard period with downlink reception. For example, the UE applies one or more rules to determines that an SRS TA needs to be applied to mitigate the impact of the SRS transmission to the UL transmission and/or DL reception. If the number of scheduled SRS symbols in a slot is larger than a predefined threshold number (e.g., two), the UE determines that the SRS transmission impacts UL transmission in symbols outside of the SRS occasion (if the first SRS symbol is the ninth symbol) of the slot or the UL transmission using the adjacent slot (if the SRS symbol is the last symbol of the slot). Similarly, if the SRS symbol is the first symbol in the SRS occasion or its guard period is the eighth symbol of the slot, the symbols outside of the SRS occasion. If the SRS symbol is the last symbol in the SRS occasion, then its guard period falls at least in the first symbol of the adjacent slot and the UL transmission using this slot is impacted. Alternatively or additionally, if a partial or full overlap exists between an SRS symbol or its guard period with a DL slot, the DL reception is impacted. SRS TA can be determined for forwarding or delaying the SRS transmission per FIGS. 6 and 7. The UE can determine the value of the SRS TA to use based on these rules or by indicating the impact to the UL transmission and/or DL reception to the network that, in turn, responds with an indication about the specific SRS TA to use. As indicated herein above in the sequence diagram 1100, the UE can be configured with a set of candidate SRS TAs and can select therefrom or further receive an indication from the network about the SRS TA to use from this candidate set. Alternatively, the UE can pre-store one or more SRS TAs values and select, based on the rules, the relevant SRS TA to use.

The operation flow/algorithmic structure 1200 may include, at 1208, transmitting the SRS symbol based on the SRS TA. For example, the timing for transmitting the SRS symbol is forwarded or delayed depending on the above determination.

Figure 13:
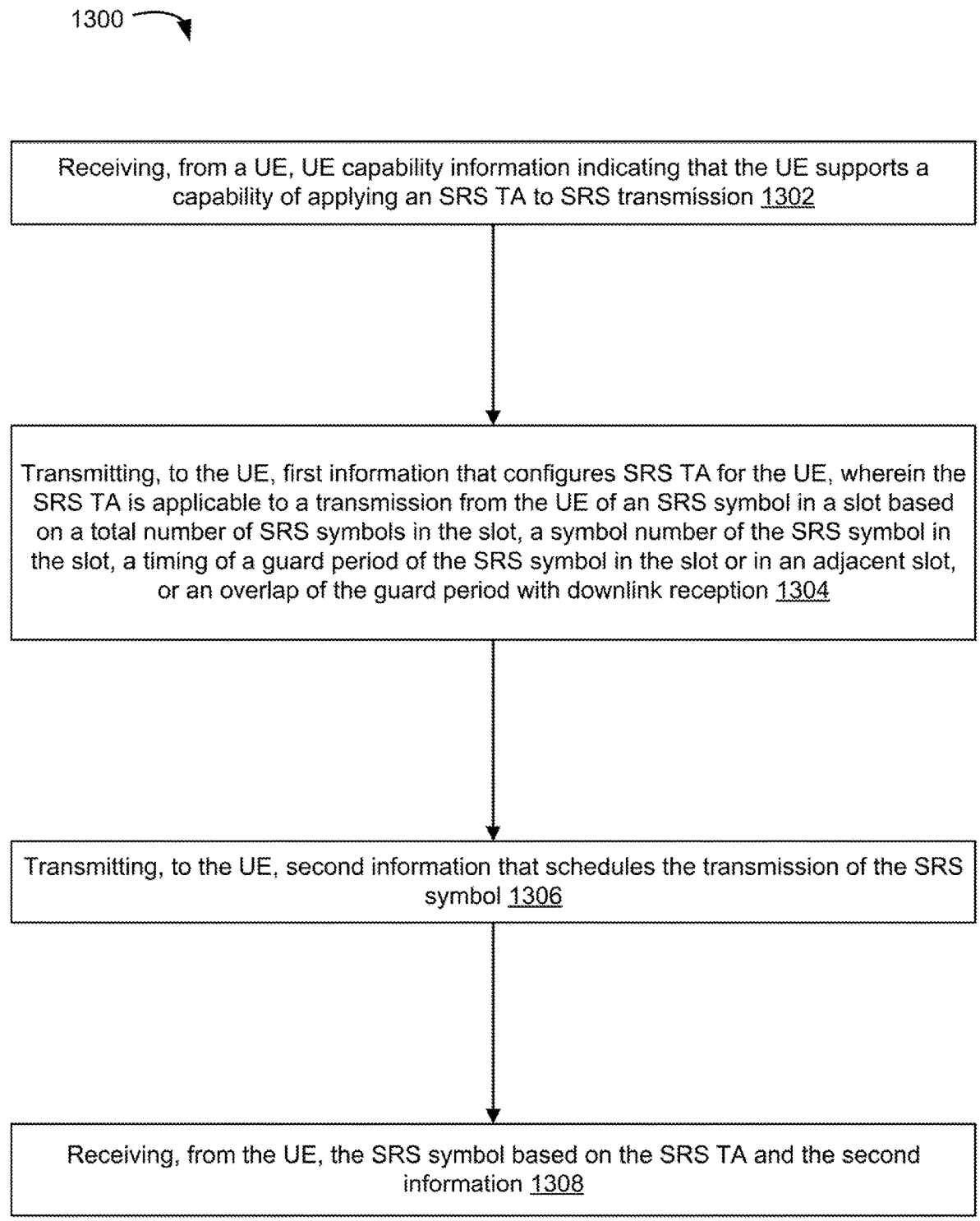
FIG. 13 illustrates another example of an operational flow/algorithmic structure for timing an SRS transmission based on an SRS TA, in accordance with some embodiments.

FIG. 13 illustrates another example of an operational flow/algorithmic structure for timing an SRS transmission based on an SRS TA, in accordance with some embodiments. A base station can implement the operational flow/algorithmic structure 1300 to avoid or reduce the impact to DL reception and/or UL transmission, when the impact is due to the UE capability for SRS Tx antenna port switching. The operation flow/algorithmic structure 1300 may be performed or implemented by the base station such as, for example, the gNB 138, a base station of the network 820, or gNB 160), or components thereof, for example, processors 1604. The base station can be communicatively coupled with a UE via one or more uplink CCs and one or more DL CCs.

The operation flow/algorithmic structure 1300 may include, at 1302, receiving, from the UE, UE capability information indicating that the UE supports a capability of applying SRA to SRS transmission. This capability can be indicated as being related to the UE capability for SRS Tx antenna port switching.

The operation flow/algorithmic structure 1300 may include, at 1304, transmitting to the UE, first information that configures SRS TA for the UE. The SRS TA is applicable to a transmission from the UE of an SRS symbol in a slot based on a total number of SRS symbols in the slot, a symbol number of the SRS symbol in the slot, a timing of a guard period of the SRS symbol in the slot or in an adjacent slot, or an overlap of the guard period with DL reception. In an example, the first information configures a set of candidate SRS TAs for the UE and is sent via RRC signaling to indicate the length of each of these candidate SRS TAs, applicable SRS resources, applicable SRS resource sets, applicable CCs, applicable serving cells, applicable SCSs, etc.

The operation flow/algorithmic structure 1300 may include, at 1306, transmitting, to the UE, second information that schedules the transmission of the SRS symbol. In example the second information includes SRS scheduling information. This information indicates a set of symbols/slots/occasions for SRS transmission by the UE and can be sent via RRC signaling, MAC CE, and/or DCI.

The operation flow/algorithmic structure 1300 may include, at 1308, receiving, from the UE, the SRS symbol based on the SRS TA and the second information. In an example, the UE advances or delays the transmission of the SRS symbol by the SRS TA, thereby the base station receives an advanced or a delayed SRS symbol. The UE can select the SRS TA from the set of candidate TAs based on rules stored at the UE. Additionally or alternatively, the UE can send information about an impact to the UL transmission and/or DL reception and the base station can send an indication of the specific SRS TA from the candidate set to use.

Figure 14:
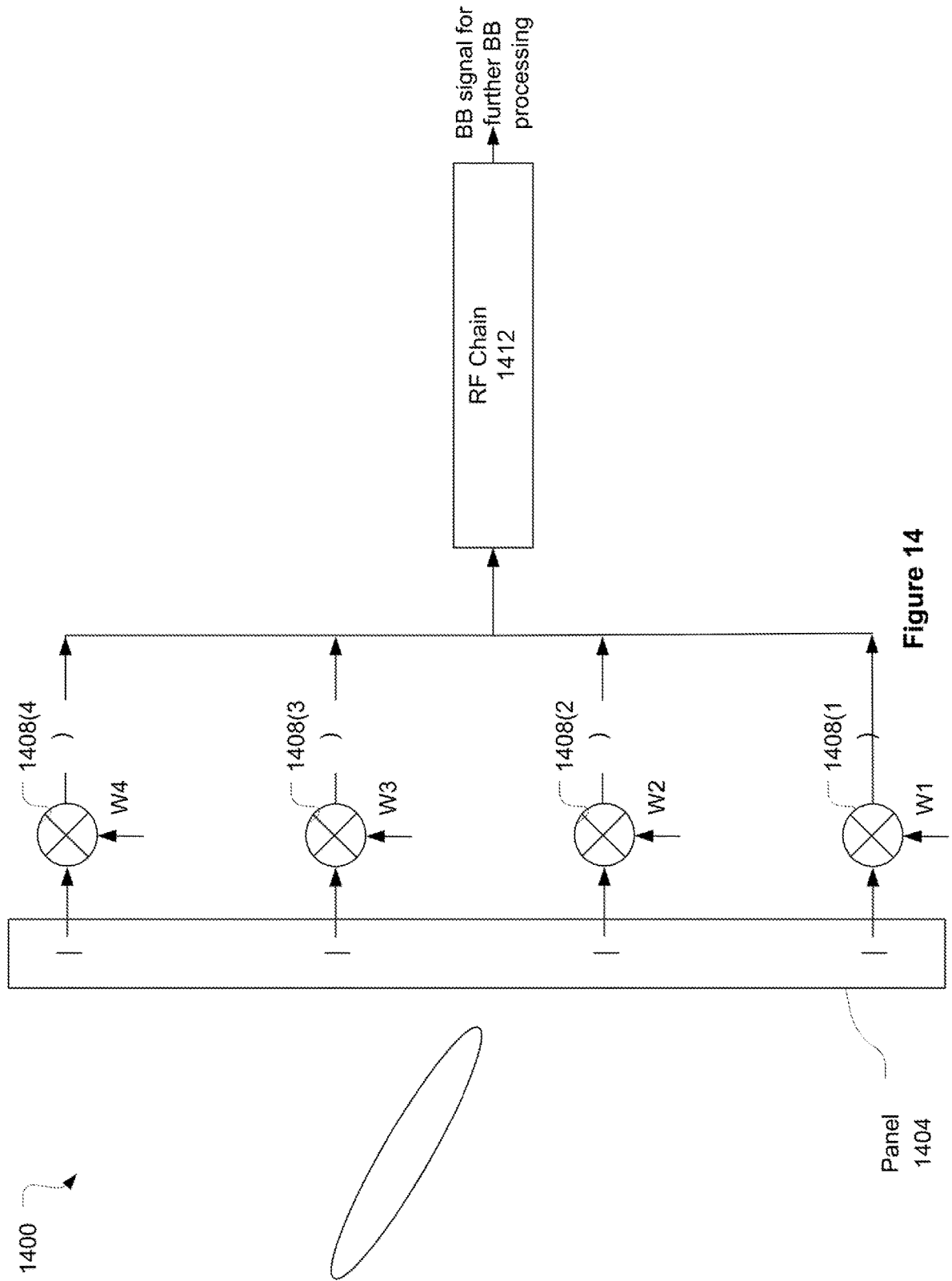
FIG. 14 illustrates an example of receive components, in accordance with some embodiments.

FIG. 14 illustrates receive components 1400 of the UE 104 in accordance with some embodiments. The receive components 1400 may include an antenna panel 1404 that includes a number of antenna elements. The panel 1404 is shown with four antenna elements, but other embodiments may include other numbers.

The antenna panel 1404 may be coupled to analog beamforming (BF) components that include a number of phase shifters 1408(1)-1408(4). The phase shifters 1408(1)-1408(4) may be coupled with a radio-frequency (RF) chain 1412. The RF chain 1412 may amplify a receive analog RF signal, down-convert the RF signal to baseband, and convert the analog baseband signal to a digital baseband signal that may be provided to a baseband processor for further processing.

In various embodiments, control circuitry, which may reside in a baseband processor, may provide BF weights (for example W1-W4), which may represent phase shift values, to the phase shifters 1408(1)-1408(4) to provide a receive beam at the antenna panel 1404. These BF weights may be determined based on the channel-based beamforming.

Figure 15:
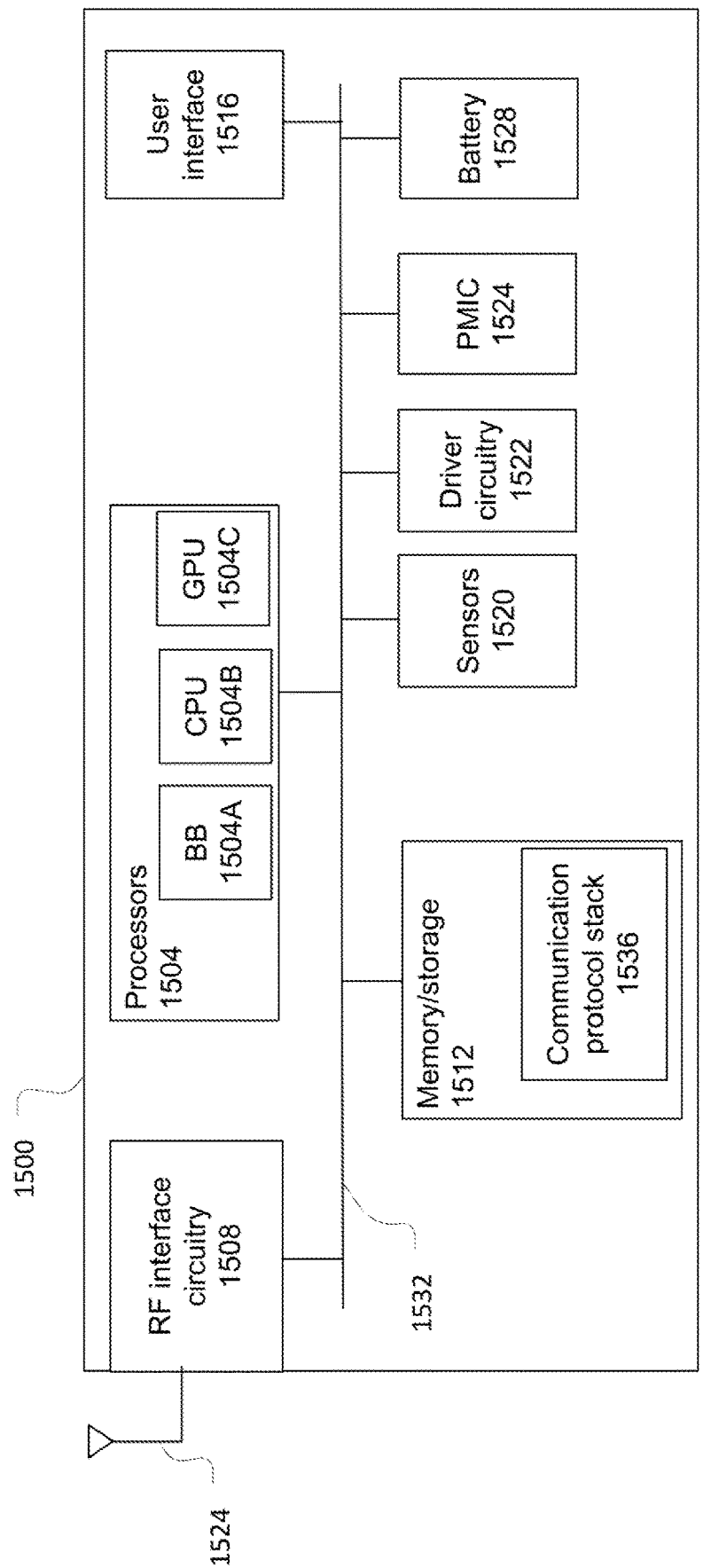
FIG. 15 illustrates an example of a UE, in accordance with some embodiments.

FIG. 15 illustrates a UE 1500 in accordance with some embodiments. The UE 1500 may be similar to and substantially interchangeable with UE 154 of FIG. 1.

Similar to that described above with respect to UE 154, the UE 1500 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices, or relaxed-IoT devices. In some embodiments, the UE may be a reduced capacity UE or NR-Light UE.

The UE 1500 may include processors 1504, RF interface circuitry 1508, memory/storage 1512, user interface 1516, sensors 1520, driver circuitry 1522, power management integrated circuit (PMIC) 1524, and battery 1528. The components of the UE 1500 may be implemented as integrated circuits (ICs), portions thereof, discrete electronic devices, or other modules, logic, hardware, software, firmware, or a combination thereof. The block diagram of FIG. 15 is intended to show a high-level view of some of the components of the LE 1500. However, some of the components shown may be omitted, additional components may be present, and different arrangements of the components shown may occur in other implementations.

The components of the UE 1500 may be coupled with various other components over one or more interconnects 1532, which may represent any type of interface, input/output, bus (local, system, or expansion), transmission line, trace, optical connection, etc. that allows various circuit components (on common or different chips or chipsets) to interact with one another.

The processors 1504 may include processor circuitry such as, for example, baseband processor circuitry (BB) 1504A, central processor unit circuitry (CPU) 1504B, and graphics processor unit circuitry (GPU) 1504C. The processors 1504 may include any type of circuitry or processor circuitry that executes or otherwise operates computer-executable instructions, such as program code, software modules, or functional processes from memory/storage 1512 to cause the UE 1500 to perform operations as described herein.

In some embodiments, the baseband processor circuitry 1504A may access a communication protocol stack 1536 in the memory/storage 1512 to communicate over a 3GPP compatible network. In general, the baseband processor circuitry 1504A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer. RRC layer, and a non-access stratum "NAS" layer. In some embodiments, the PHY layer operations may additionally/alternatively be performed by the components of the RF interface circuitry 1508.

The baseband processor circuitry 1504A may generate or process baseband signals or waveforms that carry information in 3GPP-compatible networks. In some embodiments, the waveforms for NR may be based on cyclic prefix OFDM (CP-OFDM) in the uplink or downlink, and discrete Fourier transform spread OFDM (DFT-S-OFDM) in the uplink.

The baseband processor circuitry 1504A may also access group information 1524 from memory/storage 1512 to determine search space groups in which a number of repetitions of a PDCCH may be transmitted.

The memory/storage 1512 may include any type of volatile or non-volatile memory that may be distributed throughout the UE 1500. In some embodiments, some of the memory/storage 1512 may be located on the processors 1504 themselves (for example, L1 and L2 cache), while other memory/storage 1512 is external to the processors 1504 but accessible thereto via a memory interface. The memory/storage 1512 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1508 may include transceiver circuitry and a radio frequency front module (RFEM) that allows the UE 1500 to communicate with other devices over a radio access network. The RF interface circuitry 1508 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via an antenna 1524 and proceed to filter and amplify (with a low-noise amplifier) the signal. The signal may be provided to a receiver of the transceiver that down-converts the RF signal into a baseband signal that is provided to the baseband processor of the processors 1504.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1524.

In various embodiments, the RF interface circuitry 1508 may be configured to transmit/receive signals in a manner compatible with NR access technologies.

The antenna 1524 may include a number of antenna elements that each convert electrical signals into radio waves to travel through the air and to convert received radio waves into electrical signals. The antenna elements may be arranged into one or more antenna panels. The antenna 1524 may have antenna panels that are omnidirectional, directional, or a combination thereof to enable beamforming and multiple input, multiple output communications. The antenna 1524 may include microstrip antennas, printed antennas fabricated on the surface of one or more printed circuit boards, patch antennas, phased array antennas, etc. The antenna 1524 may have one or more panels designed for specific frequency bands including bands in FR1 or FR2.

The user interface circuitry 1516 includes various input/output (I/O) devices designed to enable user interaction with the UE 1500. The user interface 1516 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 1500.

The sensors 1520 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers; gyroscopes; or magnetometers; microelectromechanical systems or nanoelectromechanical systems comprising 3-axis accelerometers; 3-axis gyroscopes; or magnetometers; level sensors; flow sensors; temperature sensors (for example, thermistors); pressure sensors; barometric pressure sensors; gravimeters; altimeters; image capture devices (for example; cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1522 may include software and hardware elements that operate to control particular devices that are embedded in the UE 1500, attached to the UE 1500, or otherwise communicatively coupled with the UE 1500. The driver circuitry 1522 may include individual drivers allowing other components to interact with or control various input/output (I/O) devices that may be present within, or connected to, the UE 1500. For example, driver circuitry 1522 may include a display driver to control and allow access to a display device, a touchscreen driver to control and allow access to a touchscreen interface, sensor drivers to obtain sensor readings of sensor circuitry 1520 and control and allow access to sensor circuitry 1520, drivers to obtain actuator positions of electro-mechanic components or control and allow access to the electro-mechanic components, a camera driver to control and allow access to an embedded image capture device, audio drivers to control and allow access to one or more audio devices.

The PMIC 1524 may manage power provided to various components of the UE 1500. In particular, with respect to the processors 1504, the PMIC 1524 may control power-source selection, voltage scaling, battery charging, or DC-to-DC conversion.

In some embodiments, the PMIC 1524 may control, or otherwise be part of, various power saving mechanisms of the UE 1500. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1500 may power down for brief intervals of time and thus save power. If there is no data traffic activity for an extended period of time, then the UE 1500 may transition off to an RRC_Idle state, where it disconnects from the network and does not perform operations such as channel quality feedback, handover, etc. The UE 1500 goes into a very low power state and it performs paging where again it periodically wakes up to listen to the network and then powers down again. The UE 1500 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1528 may power the UE 1500, although in some examples the UE 1500 may be mounted deployed in a fixed location, and may have a power supply coupled to an electrical grid. The battery 1528 may be a lithium ion battery, a metal-air battery, such as a zinc-air battery, an aluminum-air battery, a lithium-air battery, and the like. In some implementations, such as in vehicle-based applications, the battery 1528 may be a typical lead-acid automotive battery.

Figure 16:
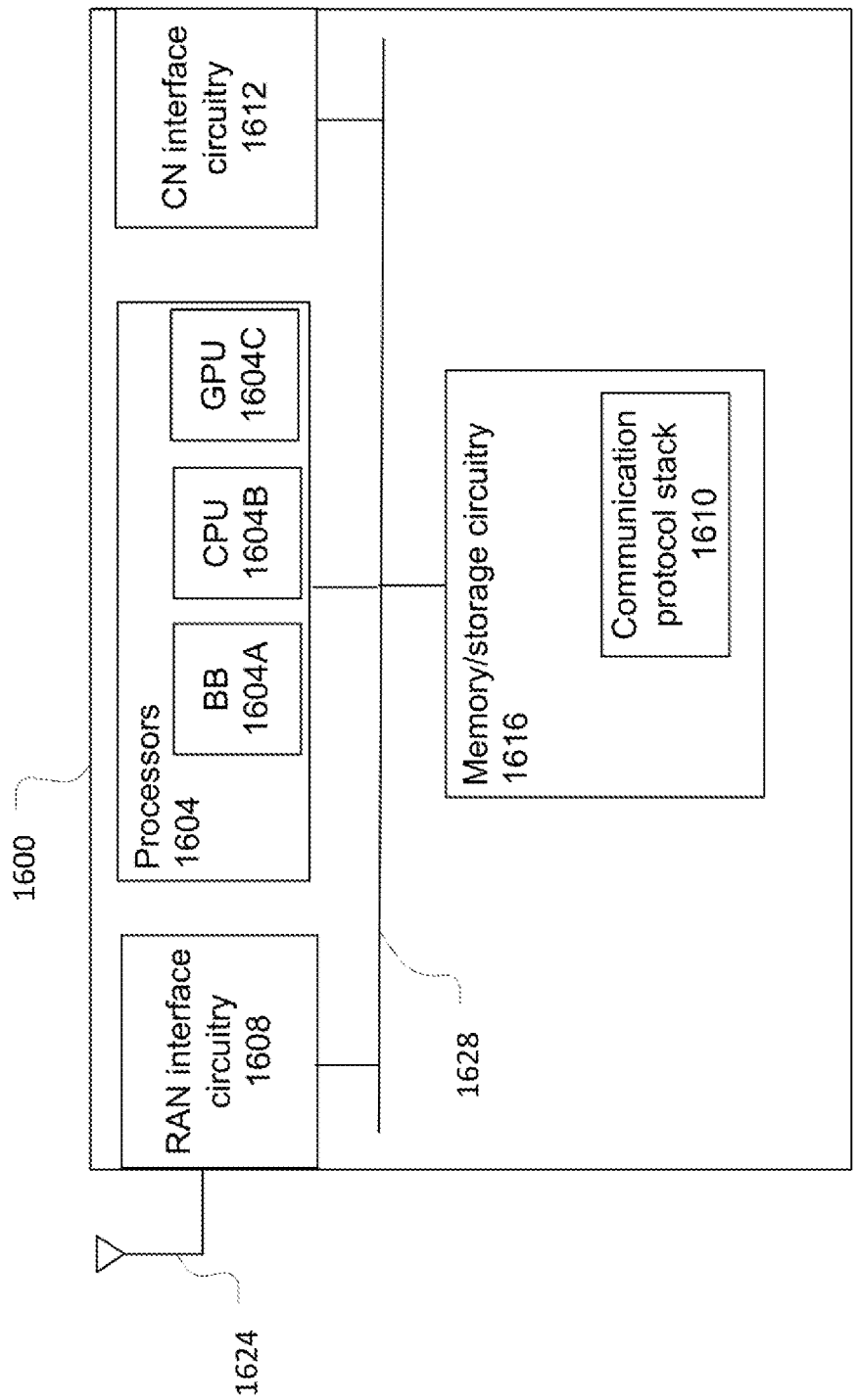
FIG. 16 illustrates an example of a base station, in accordance with some embodiments.

FIG. 16 illustrates a gNB 1600 in accordance with some embodiments. The gNB node 1600 may be similar to and substantially interchangeable with gNB 148. A base station, such as the base station 162, can have the same or similar components as the gNB 1600.

The gNB 1600 may include processors 1604. RF interface circuitry 1608, core network (CN) interface circuitry 1612, and memory/storage circuitry 1616.

The components of the gNB 1600 may be coupled with various other components over one or more interconnects 1628.

The processors 1604, RF interface circuitry 1608, memory/storage circuitry 1616 (including communication protocol stack 1610), antenna 1624, and interconnects 1628 may be similar to like-named elements shown and described with respect to FIG. 14.

The CN interface circuitry 1612 may provide connectivity to a core network, for example, a 5$^{th}$ Generation Core network (5GC) using a 5GC-compatible network interface protocol such as carrier Ethernet protocols, or some other suitable protocol. Network connectivity may be provided to/from the gNB 1600 via a fiber optic or wireless backhaul. The CN interface circuitry 1612 may include one or more dedicated processors or FPGAs to communicate using one or more of the aforementioned protocols. In some implementations, the CN interface circuitry 1612 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method. The method is implemented on a user equipment. The method comprises: receiving, from a network, downlink scheduling information; receiving, from the network, sounding reference signal (SRS) scheduling information to schedule an SRS transmission; determining an overlap between downlink reception scheduled based on the downlink scheduling information and ( ) the SRS transmission or (ii) a guard period associated with the SRS transmission; and based on the overlap: changing the SRS transmission, or receiving, from the network, an indication about a change to the downlink reception.

Example 2 includes a method of example 1, wherein the downlink reception is in a first slot, wherein the SRS transmission is scheduled based on the UE having a capability of SRS transmit antenna port switching and is in a second slot that overlaps at least partially with the first slot.

Example 3 includes a method of any preceding examples 1-2, wherein the downlink reception is in a first slot, wherein the SRS transmission is scheduled based on the UE having a capability of SRS transmit antenna port switching and is in a second slot that does not overlap with the first slot, and wherein the overlap comprises the guard period extending at least partially in the first slot.

Example 4 includes a method of any preceding examples 1-3, wherein the downlink reception and the SRS transmission are scheduled in different slots, wherein the overlap is between the downlink reception and the guard period and has an overlap time length, wherein the overlap is determined based on the overlap time length being equal to or larger than predefined threshold time.

Example 5 includes a method of any preceding examples 1-4, The method of claim 1, wherein the downlink reception and the SRS transmission are scheduled in different slots, wherein the overlap is between the downlink reception and the guard period, wherein the guard period is indicated to the network Example 6 includes a method of any preceding examples 1-5, wherein the downlink scheduling information schedules a set of downlink symbols, a set of downlink slots, or a set of downlink occasions, wherein the downlink reception comprises high priority downlink data, a reference signal for layer 1 or layer 3 measurement, or system information, wherein the SRS transmission comprises an SRS symbol, wherein the overlap comprises a full or partial overlap of the SRS symbol with the downlink reception or a full or partial overlap of the guard period with the downlink reception.

Example 7 includes a method of any preceding examples 1-6, wherein the downlink reception and the SRS transmission are scheduled in different slots, wherein the overlap is between the downlink reception and the guard period and has an overlap time length, and wherein the method further comprising: indicating the overlap time length to the network; and receiving an indication from the network about a change to the SRS transmission or the change to the downlink reception.

Example 8 includes a method of any preceding examples 1-7, wherein changing the SRS transmission comprises aborting the SRS transmission without an indication from the UE to the network about the overlap.

Example 9 includes a method of any preceding examples 1-8, further comprising: indicating the overlap to the network; and receiving an indication from the network about a change to the SRS transmission, wherein the change comprises rescheduling the SRS transmission or aborting the SRS transmission.

Example 10 includes a method of any preceding examples 1-9, further comprising: indicating the overlap to the network; and receiving an indication from the network about a rescheduling of the downlink reception or an abortion of the downlink reception.

Example 11 includes a method of any preceding examples 1-10, further comprising: transmitting, to the network, UE capability information indicating that the UE lacks a capability of applying an SRS timing advance (TA) to the SRS transmission.

Example 12 includes a method. The method is implemented by a base station. The method comprises: transmitting, to a user equipment (UE), downlink scheduling information; transmitting, to the UE, sounding reference signal (SRS) scheduling information to schedule an SRS transmission; receiving, from the UE, a first indication about an overlap, wherein the overlap is between downlink reception scheduled based on the downlink scheduling information and (i) the SRS transmission or (ii) a guard period associated with the SRS transmission; and transmitting, to the UE based on the first indication, a second indication about a change to at least one of the SRS transmission or the downlink reception.

Example 13 includes a method of example 12, wherein the second indication indicates a rescheduling of the SRS transmission or an abortion of the SRS transmission.

Example 14 includes a method of any preceding examples 12-13, wherein the second indication indicates a rescheduling of the downlink reception or an abortion of the downlink reception.

Example 15 includes a method of any preceding examples 12-14, further comprising: receiving, from the UE, UE capability information indicating that the UE lacks a capability of applying an SRS timing advance (TA) to the SRS transmission, wherein the second indication is sent to the UE based on the UE capability information.

Example 16 includes a method. The method is implemented by a user equipment (UE). The method comprises: receiving, from a network, information that schedules transmission of a sounding reference signal (SRS) symbol in a slot; determining an SRS timing advance (TA) that is applicable to the transmission of the SRS symbol based on a total number of SRS symbols in the slot, a symbol number of the SRS symbol in the slot, a timing of a guard period of the SRS symbol in the slot or in an adjacent slot, or an overlap of the guard period with downlink reception; and transmitting the SRS symbol based on the SRS TA.

Example 17 includes a method of example 16, wherein the SRS TA is inapplicable to transmission of a non-SRS symbol in the slot.

Example 18 includes a method of any preceding examples 16-17, wherein the SRS TA is inapplicable to transmission of another SRS symbol in the adjacent slot.

Example 19 includes a method of any preceding examples 16-18, wherein the SRS TA is applicable to the transmission of the SRS symbol based on the total number of SRS symbols in the slot exceeding a threshold number.

Example 20 includes a method of any preceding examples 16-19, wherein the SRS TA is applicable to the transmission of the SRS symbol based on the symbol number indicating that the SRS symbol is a first symbol or a last symbol of an SRS occasion in the slot.

Example 21 includes a method of any preceding examples 16-20, wherein the SRS TA is applicable to the transmission of the SRS symbol based on the timing of the guard period indicating that the guard period is outside of the SRS occasion in the slot.

Example 22 includes a method of any preceding examples 16-21, wherein the downlink reception and the transmission of the SRS symbol are scheduled in different slots, wherein the SRS TA is applicable to the transmission of the SRS symbol based on the overlap being between the downlink reception and the guard period or between the guard period and an uplink transmission that uses another slot.

Example 23 includes a method of any preceding examples 16-22, wherein the SRS TA has a value equal to a symbol length times a multiplier, wherein the symbol length is based on SRS subcarrier spacing (SCS), a physical uplink control channel (PUCCH) SCS, or a physical uplink shared channel (PUSCH) SCS.

Example 24 includes a method of any preceding examples 16-23, further comprising: determining that the total number of SRS symbols in the slot exceeds a threshold number: and advancing the transmission of the SRS symbol by a value of the SRS TA.

Example 25 includes a method of any preceding examples 16-24, further comprising: determining that the SRS symbol is either a first symbol or a last symbol of an SRS occasion of the slot; and advancing the transmission of the SRS symbol by a value of the SRS TA when the SRS symbol is the last symbol: or delaying the transmission of the SRS symbol by the value of the SRS TA when the SRS symbol is the first symbol.

Example 26 includes a method of any preceding examples 16-25, further comprising: determining that the guard period of the SRS symbol is either an eighth symbol of the slot or a first symbol of the adjacent slot; and advancing the transmission of the SRS symbol by a value of the SRS TA when the guard period is the first symbol of the adjacent slot; or delaying the transmission of the SRS symbol by the value of the SRS TA when the guard period is the eighth symbol of the slot.

Example 27 includes a method of any preceding examples 16-26, wherein the downlink reception and the transmission of the SRS symbol are scheduled in different slots, and wherein the method further comprises: determining that the transmission of the SRS symbol is either before or after the downlink reception; and advancing the transmission of the SRS symbol by a value of the SRS TA when the transmission of the SRS symbol is before the downlink reception; or delaying the transmission of the SRS symbol by the value of the SRS TA when the transmission of the SRS symbol is after the downlink reception.

Example 28 includes a method of any preceding examples 16-27, further comprising: transmitting, to the network, UE capability information indicating that the UE supports a capability of applying timing advances to SRS transmissions.

Example 29 includes a method of any preceding examples 16-28, wherein a value of the SRS TA is stored, prior to transmitting the UE capability information, in a memory of the UE, wherein the value is predefined per SRS resource. SRS resource set, per UE, per component carrier, per serving cell, or per subcarrier spacing.

Example 30 includes a method. The method is implemented by abase station. The method comprises: transmitting, to a user equipment (UE), first information that configures a sounding reference signal (SRS) timing advance (TA) for the UE, wherein the SRS TA is applicable to a transmission from the UE of an SRS symbol in a slot based on a total number of SRS symbols in the slot, a symbol number of the SRS symbol in the slot, a timing of a guard period of the SRS symbol in the slot or in an adjacent slot, or an overlap of the guard period with downlink reception; transmitting, to the UE, second information that schedules the transmission of the SRS symbol; and receiving, from the UE, the SRS symbol based on the SRS TA and the second information.

Example 31 includes a method of example 30, wherein the first information configures a set of candidate SRS TAs, and wherein the method further comprises: determining the total number of SRS symbols in the slot, the symbol number of the SRS symbol in the slot, the timing of the guard period of the SRS symbol, or the overlap of the guard period with the downlink reception; and transmitting, to the UE, third information that indicates the SRS TA from the set of candidate SRS TAs.

Example 32 includes a method of example 31, wherein the first information is transmitted in a radio resource control (RRC) configuration, a first media access control (MAC) control element (CE), or first downlink control information (DCI), and wherein the third information is sent in a second MAC CE or second DCI Example 33 includes a method of any preceding examples 30-32, further comprising: receiving, from the UE, UE capability information indicating that the UE supports a capability of applying timing advances to SRS transmissions, wherein the first information is sent based on the UE capability information.

Example 34 includes a UE comprising means to perform one or more elements of a method described in or related to any of the examples 1-11 and 16-28.

Example 35 includes one or more computer-readable media storing instructions that, upon execution by a UE, cause the UE to perform operations of a method described in or related to any of the examples 1-11 and 16-28.

Example 36 includes a UE comprising logic, modules, or circuitry to perform one or more elements of a method described in or related to any of the examples 1-11 and 16-28.

Example 37 includes a UE comprising: one or more processors and one or more computer-readable media comprising instructions that, upon execution by the one or more processors, configure the UE to perform any of the examples 1-11 and 16-28.

Example 38 includes a base station comprising means to perform one or more elements of a method described in or related to any of the examples 12-15 and 30-33.

Example 39 includes one or more computer-readable media storing instructions that, upon execution by a base station, cause the base station to perform operations of a method described in or related to any of the examples 12-15 and 30-33.

Example 40 includes a base station comprising logic, modules, or circuitry to perform one or more elements of a method described in or related to any of the examples 12-15 and 30-33.

Example 41 includes a base station comprising: one or more processors and one or more computer-readable media comprising instructions that, upon execution by the one or more processors, configure the base station to perform any of the examples 12-15 and 30-33.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described inconsiderable detail, numerous variations and modifications will become apparent to those skilled in the art once the above disclosure is fully appreciated. It is intended that the following claims be interpreted to embrace all such variations and modifications.

What is claimed is:

1. A method comprising:
   indicating, to a network, a capability of a user equipment (UE) to support sounding reference signal (SRS) antenna port switching and an impact of using the SRS antenna port switching to downlink reception;
   receiving, from the network, data scheduling information;
   receiving, from the network, SRS scheduling information to schedule an SRS transmission; and
   performing, based on the impact and a determination that a collision is non-existent between a data communication and the SRS transmission, the SRS transmission using the SRS antenna port switching, the data communication scheduled based on the data scheduling information.

2. The method of claim 1, wherein the SRS transmission is scheduled based on the UE having the capability to support the SRS antenna port switching.

3. The method of claim 1, wherein the collision is non-existent between one or more symbols of the data communication and one or more SRS symbols of the SRS transmission.

4. The method of claim 1, wherein the downlink reception and the SRS transmission are scheduled in different slots.

5. The method of claim 1, wherein the downlink reception and the SRS transmission are scheduled in different slots, wherein the SRS transmission comprises an SRS symbol, and wherein the downlink reception comprises a reference signal.

6. The method of claim 1, wherein downlink scheduling information schedules a set of downlink symbols, a set of downlink slots, or a set of downlink occasions, wherein the downlink reception is scheduled based on the downlink scheduling information and comprises high priority downlink data, a reference signal for layer 1 or layer 3measurement, or system information, wherein the SRS transmission comprises an SRS symbol.

7. The method of claim 1, wherein the downlink reception and the SRS transmission are scheduled in different slots that are separated by at least a guard period.

8. The method of claim 1, further comprising:
   receiving at least one of: (i) an indication from the network about a change to the SRS transmission, wherein the change comprises rescheduling the SRS transmission or aborting the SRS transmission, or (ii) receiving an indication from the network about a rescheduling of the downlink reception or an abortion of the downlink reception.

9. The method of claim 1, wherein the impact corresponds to a txSwitchImpactToRx parameter defined according to 3GPP technical specification.

10. The method of claim 1, wherein the collision is between the data communication in a first slot of a first channel and the SRS transmission in a second slot of a second channel.

11. A base station comprising:
   one or more processors; and
   one or more memories storing computer-readable instructions that, upon execution by the one or more processors, configure the base station to:
      receive, from a user equipment (UE), capability information indicating a capability of the UE to support sounding reference signal (SRS) antenna port switching and an impact of using the SRS antenna port switching to downlink reception;
      transmit, to the UE, data scheduling information;
      transmit, to the UE, SRS scheduling information to schedule an SRS transmission; and
      receive the SRS transmission from the UE, wherein the SRS transmission is based on the impact a determination that a collision is non-existent between a data communication and the SRS transmission, wherein the SRS transmission uses the SRS antenna port switching, and wherein the data communication is scheduled based on the data scheduling information.

12. The base station of claim 11, wherein a guard period exists between the data communication and the SRS transmission.

13. The base station of claim 11, wherein the execution of the computer-readable instructions further configures the base station to:
receive, from the UE, additional UE capability information indicating that the UE lacks a capability of applying an SRS timing advance (TA) to the SRS transmission.

14. An apparatus comprising:
one or more processors; and
one or more memories storing computer-readable instructions that, upon execution by the one or more processors, configure the one or more processors to:
  receive, from a network, information that schedules transmission of a sounding reference signal (SRS) symbol in a slot;
  determine an SRS timing advance (TA) that is applicable to the transmission of the SRS symbol based on a total number of SRS symbols in the slot, a symbol number of the SRS symbol in the slot, a timing of a guard period of the SRS symbol in the slot or in an adjacent slot, or an overlap of the guard period with downlink reception; and
  generate the SRS symbol for the transmission, the transmission being based on the determined SRS TA.

15. The apparatus of claim 14, wherein the SRS TA is applicable to the transmission of the SRS symbol based on at least one of: the total number of SRS symbols in the slot exceeding a threshold number, the symbol number indicating that the SRS symbol is a first symbol or a last symbol of an SRS occasion in the slot, or the timing of the guard period indicating that the guard period is outside of the SRS occasion in the slot.

16. The apparatus of claim 14, wherein the downlink reception and the transmission of the SRS symbol are scheduled in different slots, wherein the SRS TA is applicable to the transmission of the SRS symbol based on the overlap being between the downlink reception and the guard period or between the guard period and an uplink transmission that uses another slot.

17. The apparatus of claim 14, of claim 14, wherein the SRS TA has a value equal to a symbol length times a multiplier, wherein the symbol length is based on SRS subcarrier spacing (SCS), a physical uplink control channel (PUCCH) SCS, or a physical uplink shared channel (PUSCH) SCS.

18. The apparatus of claim 14, wherein the execution of the computer-readable instructions further configures the one or more processors to:
determine that the total number of SRS symbols in the slot exceeds a threshold number;
and advance the transmission of the SRS symbols by a value of the SRS TA.

19. The apparatus of claim 14, wherein the execution of the computer-readable instructions further configures the one or more processors to:
determine that the SRS symbol is either a first symbol or a last symbol of an SRS occasion of the slot; and
advance the transmission of the SRS symbol by a value of the SRS TA when the SRS symbol is the last symbol; or
delay the transmission of the SRS symbol by the value of the SRS TA when the SRS symbol is the first symbol.

20. The apparatus of claim 14, wherein the execution of the computer-readable instructions further configures the one or more processors to:
determine that the guard period of the SRS symbol is either an eighth symbol of the slot or a first symbol of the adjacent slot; and
advance the transmission of the SRS symbol by a value of the SRS TA when the guard period is the first symbol of the adjacent slot; or
delay the transmission of the SRS symbol by the value of the SRS TA when the guard period is the eighth symbol of the slot.

* * * * *